United States Patent [19]

Suman et al.

[11] Patent Number: 5,113,182

[45] Date of Patent: May 12, 1992

[54] VEHICLE DOOR LOCKING SYSTEM DETECTING THAT ALL DOORS ARE CLOSED

[75] Inventors: Michael J. Suman, Holland; Mark L. Zeinstra, Grandville, both of Mich.

[73] Assignee: Prince Corporation, Holland, Mich.

[21] Appl. No.: 467,541

[22] Filed: Jan. 19, 1990

[51] Int. Cl.⁵ ............................................. H04Q 1/00
[52] U.S. Cl. ..................... 340/825.31; 340/825.32; 340/426; 307/10.2
[58] Field of Search ................. 340/825.31, 825.32, 340/825.69, 825.72, 426, 428, 457.2, 528; 307/10.2, 10.3, 10.4; 180/287; 70/256, 257

[56] References Cited

U.S. PATENT DOCUMENTS

| | | | |
|---|---|---|---|
| 3,174,576 | 7/1960 | Woofter et al. | 180/90 |
| 3,196,440 | 7/1965 | Weinstein | 343/225 |
| 3,270,831 | 7/1960 | Woofter et al. | 180/90 |
| 3,399,554 | 9/1968 | Hogue | 70/262 |
| 3,590,136 | 6/1971 | Kunishi et al. | 174/50 |
| 3,635,305 | 1/1972 | Kunishi et al. | 180/90 |
| 3,703,714 | 11/1972 | Andrews | 340/426 |
| 3,706,966 | 12/1972 | So et al. | 340/428 |
| 3,707,697 | 6/1971 | Izumi | 439/107 |
| 3,723,967 | 3/1973 | Atkins et al. | 340/426 |
| 3,866,168 | 2/1975 | McGuirk, Jr. | 340/426 |
| 3,891,967 | 6/1975 | Betts | 340/428 |
| 3,891,980 | 6/1975 | Lewis et al. | 340/825.31 |
| 3,969,709 | 7/1976 | Isaacs et al. | 340/502 |
| 3,978,478 | 8/1976 | Schmitz | 340/521 |
| 4,133,405 | 11/1977 | Turek | 180/90 |
| 4,137,985 | 2/1979 | Winchell | 180/114 |
| 4,143,368 | 3/1979 | Route et al. | 340/543 |
| 4,151,507 | 4/1979 | Willis | 340/430 |
| 4,153,127 | 5/1979 | Klink et al. | 180/65 |
| 4,159,466 | 6/1979 | Mengel | 340/430 |
| 4,205,325 | 5/1980 | Haygood et al. | 340/426 |
| 4,240,516 | 12/1980 | Henerson et al. | 180/289 |
| 4,333,090 | 6/1982 | Hirsch | 380/52 |
| 4,342,024 | 7/1982 | Rossi | 340/430 |
| 4,372,410 | 2/1983 | Loken et al. | 180/89 |
| 4,383,242 | 5/1983 | Sassover et al. | 340/429 |
| 4,421,190 | 12/1983 | Martinson et al. | 180/90 |
| 4,463,340 | 7/1984 | Adkins et al. | 340/426 |
| 4,505,054 | 3/1985 | Clark et al. | 33/357 |
| 4,573,046 | 2/1986 | Pinnow | 340/825.56 |
| 4,602,256 | 7/1986 | Kago et al. | 340/825.72 |
| 4,620,268 | 10/1986 | Ferenc | 362/74 |
| 4,665,397 | 5/1987 | Pinnow | 340/825.56 |
| 4,670,746 | 6/1987 | Tangiguchi et al. | 340/825.31 |
| 4,672,375 | 6/1987 | Mochida et al. | 340/825.31 |
| 4,688,036 | 11/1987 | Hirano et al. | 340/825.06 |
| 4,719,460 | 1/1988 | Takeuchi et al. | 340/825.31 |
| 4,723,121 | 2/1988 | van den Boom et al. | 340/825.31 |
| 4,737,784 | 4/1988 | Hirano | 340/825.31 |
| 4,754,255 | 6/1988 | Sanders et al. | 340/426 |
| 4,760,394 | 7/1988 | Takeuchi et al. | 340/825.54 |
| 4,761,645 | 8/1988 | Mochida | 340/825.31 |
| 4,794,268 | 12/1988 | Nakano et al. | 307/10.2 |
| 4,794,368 | 12/1988 | Grossheim et al. | 340/528 |
| 4,825,210 | 4/1989 | Bachhuber et al. | 340/825.31 |
| 4,835,533 | 5/1989 | Akutsu | 340/825.31 |
| 4,853,687 | 8/1989 | Isomura et al. | 340/825.31 |
| 4,856,072 | 8/1989 | Schneider et al. | 340/825.31 |
| 4,868,559 | 9/1989 | Pinnow | 340/825.31 |
| 4,881,148 | 11/1989 | Lambropoulos et al. | 307/10.2 |
| 4,896,050 | 1/1990 | Shin-Chung | 340/825.69 |
| 4,920,338 | 4/1990 | Tsunoda et al. | 340/825.31 |

FOREIGN PATENT DOCUMENTS 2051442  3/1980  United Kingdom ........... 340/825.31

*Primary Examiner*—Donald J. Yusko
*Assistant Examiner*—Edwin C. Holloway, III
*Attorney, Agent, or Firm*—Price, Heneveld, Cooper, DeWitt & Litton

[57] ABSTRACT

A vehicle control system includes a microcontroller based switch programmable module which allows a variety of different vehicle options to be selectively actuated by different vehicle users. In one embodiment a remote transmitter provides a unique user code and the control system includes the capability of programming the transmitter code to allow use of multiple transmitters with different codes for different users.

2 Claims, 18 Drawing Sheets

VEHICLE DOOR LOCKING SYSTEM DETECTING THAT ALL DOORS ARE CLOSED

BACKGROUND OF THE INVENTION

The present invention pertains to an electronic control system for selecting vehicle options.

Modern vehicles are typically manufactured to accommodate different levels of options. For ease of manufacture and cost reduction, all vehicles of a given car line may include wiring harness, connectors and mounting structure to allow such different levels of options to be selectively added either during manufacturing or by the dealer. Thus for example, even though a vehicle may have electrically operated windows but manual door locks, the wiring for electrical locks will be included in the door panels. Also some optional features such as express windows (i.e. a momentary touch of the control activates a window to a full down or up position) only require existing circuits to be programmed or a module added to allow such operation.

In recent years, and spawned by the increase of vehicle thefts, vehicle electronics have included keypad or remote controlled so-called keyless entry systems for vehicles. When remotely coded infrared or radio frequency control signals are employed for unlocking and locking vehicle doors or a vehicle trunk. Such systems frequently provide anti-theft alarms and the convenience o secure access to a vehicle without the need for fumbling with keys and physically unlocking a vehicle door or trunk.

One proposed system, in addition to the unlocking and locking of vehicle doors and trunk, also controls the activation of the interior lights of the vehicle and can deactivate the vehicle's starter and fuel supply circuits for anti-theft protection. While such a system includes more features than a simple remote keyless entry system as exemplified, for example, by U.S. Pat. No. 3,760,422; it does not accommodate the needs of different drivers of a single vehicle or provide other vehicle control functions. Thus for example, for personal security reasons, one driver may want only the driver door to unlock remotely, while another driver of the same vehicle may want all of the doors to unlock with the actuation of the control button on their remote transmitter used in connection with the same shared vehicle. One proposed remotely controlled anti-theft system provides a multi-code system for different driver codes and suggests limited different control responses such as different odometer selections, speed control limits and the like.

SUMMARY OF THE PRESENT INVENTION

The system of the present invention provides a control which is programmable by either the manufacturer, dealer or the operator to automatically provide selected vehicle control functions such as express windows, single button selection of driver door or all doors unlock, last door closed locks the doors and others. A vehicle when manufactured can and frequently is pre-wired to allow different options to be added either later o the assembly line or by a dealer. With the preferred embodiment of the present invention, a plurality of such available options can be selectively enabled, using a programmable control module programmed by the vehicle manufacturer, by the dealer or even by different operators of the same vehicle. In another embodiment the system includes a receiver for providing remote control for such functions. The receiver, in such embodiment, responds to unique signals from multiple transmitters, one for each user of a vehicle; for providing preselected driver-unique functions. The receiver, in a preferred embodiment, can be operator programmed to respond to a coded transmitted signal for any transmitter.

Systems embodying the present invention, include a programmable control circuit and means for coupling the circuit to interface with a variety of controllable vehicle options. In one embodiment of the invention the system includes a receiver coupled to the programmable control circuit and at least one small portable transmitter for use by a vehicle operator for transmitting encoded energy to the receiver mounted in a vehicle. The energy may take the form of radio frequency, infrared or other transmittable energy which can identify a particular vehicle operator and control function. The control circuit in this embodiment includes memory means and circuit means for comparing a received signal with preprogrammed operator codes and preselected control functions such that when a vehicle code is received, one or more selectable options are automatically selected depending upon the given operator's previous programming.

In one embodiment of the invention, the receiver includes a programmable memory such that it can be trained to respond to an individual transmitter code when in a training mode. Thus if a transmitter replacement is necessary, or a new transmitter with a different user code added, no service is required on the receiver. In the preferred embodiment of the invention, both the receiver and the transmitters are microprocessor based.

Thus the system of the present invention provides a vehicle control which can be customized for individual operator selection and can be remotely controlled to automatically respond to an individual operator with preprogrammed control functions. These and other features, objects and advantages of the present invention, can best be understood by referring to the following description of the invention together with reference to the accompanying drawings in which:

DETAILED DESCRIPTION OF THE PREFERRED EMBODIMENT

Figure 1:
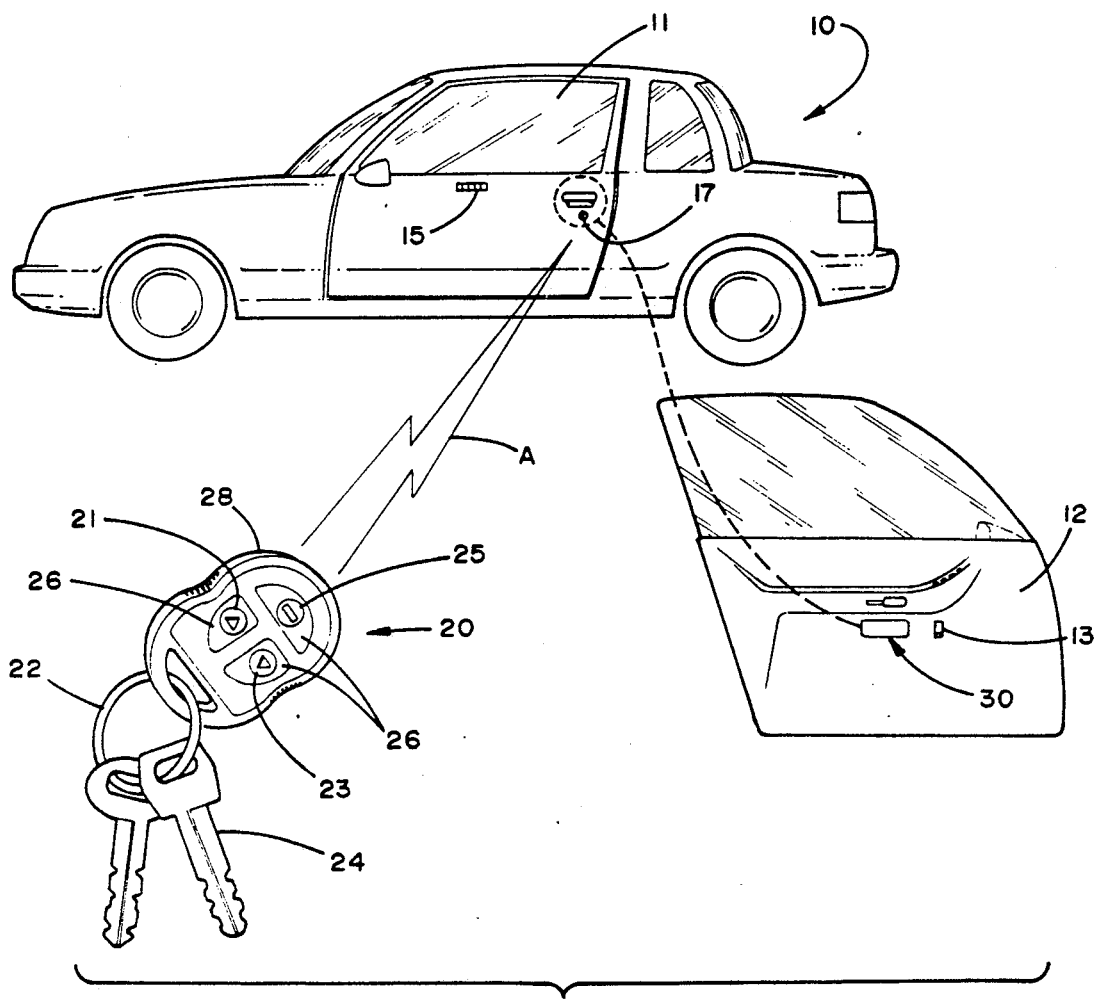
FIG. 1 is a schematic view of a vehicle including one embodiment of the control system of the present invention.

Referring initially to FIG. 1 there is shown a vehicle 10 embodying the system of the present invention. In the example shown, the vehicle is an automobile which typically will include two or four doors, possibly a sliding side door, and a lockable hatch or trunk. The vehicle includes factory installed electrical door locks 17, power activated windows 11, and other powered accessories shown schematically in FIG. 4, such as a trunk release solenoid. The system of one embodiment of the invention also includes as illustrated in FIG. 1, a relatively small remote transmitter 20 in the form of a key fob which may include a key chain 22 for carrying an ignition key 24, a house key 28, or the like, however, as will become apparent, no keys are necessary for the ingress to a locked vehicle. In the embodiment of the invention, utilizing the transmitter 20, its coded energy is transmitted as indicated by arrow A in FIG. 1 to a control module 30 which may be mounted within the inside door panel 12 of the vehicle as illustrated in FIG. 1 or other suitable locations. Such locations may include an overhead console which includes lamps, vehicle compasses or other vehicle accessories such as storage compartments or the like; a rear view mirror; armrests; package tray; floor console; or any other suitable area within the vehicle. The receiver receives the encoded transmitted energy, demodulates it and a programmable control circuit coupled to the receiver responds to signals therefrom to provide a variety of selected control functions. In a preferred embodiment of the invention the vehicle also includes either a keypad 15 and/or a driver select switch 13 (FIGS. 1 and 4) coupled to the programmable control circuit to identify which selectable options are derived as a function of the driver involved.

In another embodiment of the invention the transmitter 20 transmits radio frequency energy at a frequency within the 290-450 MHz band and preferably at 315 MHz the signal is modulated to provide a unique identification signal for a particular transmitter as well as control signals which identify actuation of the control switches contained on the transmitter. The transmitted signal is pulse code modulated CW into a 24 bit stream. The first bit is logic "1" start bit represented by the carrier being on. The next 21 bits uniquely identify up to 2.1 million transmitters (i.e. $2^{21}$), while the last 2 bits provide lock-unlock information, trunk release control; and a panic signal. Other transmittable energy such as infrared radiation, ultrasonic energy or the like, could also be employed, naturally, with modifications to the receiver to provide reception of such energy.

The transmitter 20 is shown in FIG. 1 and includes three push-button switches with a first switch 21 being employed for unlocking the door and carrying an arrow symbol on its surface pointing up to indicate pushing this switch, will unlock the vehicles door or doors. Transmitter 20 includes a second switch 23 for locking the doors and a third switch 25 for actuating the trunk release. The transmitter of the preferred embodiment also will provide a security or "panic" alarm if any two of the switches 21, 23 and 25 are simultaneously actuated for a predetermined period of time, such as five seconds. The control circuit responds to the received code in this instance by controlling the headlights of the vehicle so they flash on and off and pulsing the horn so the horn also sounds in an intermittent fashion. The keypad formed on the transmitter 20 is designed to prevent inadvertent actuation of two or more switches by placing each of the switch control buttons in a shallow depression 26 on the upper surface of the transmitter and spacing the buttons in a fashion such as a triangular pattern shown to prevent inadvertent actuation. The relatively large depressions 26 also allow use of the transmitter in cold weather climates in the winter where gloves are frequently worn.

Figure 2:
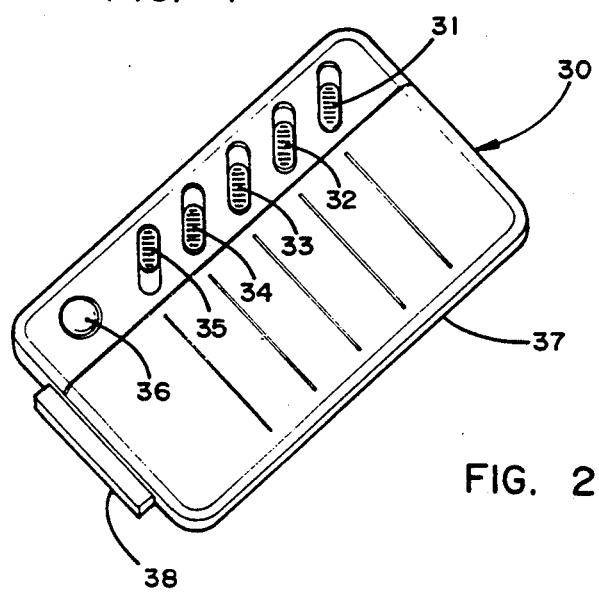
FIG. 2 is a perspective view of one embodiment of a control module employed in connection with the system of the present invention.

The control module 30 includes a programmable control circuit which, in one embodiment, includes programmable switches 31-35 as seen in FIG. 2. When the control module 30 is coupled to the vehicles electrical system it provides predetermined control functions which can be varied according to the positions selected by the switches and the driver as determined by switch 13 or the received code from transmitter 20.

Turning now to FIG. 2 which illustrates a control module design layout, it is seen that the module includes five selector switches 31-35 and a training push-button switch 36. A receiver 72 (FIG. 4) and the remaining circuits are housed in a suitable housing 37 which includes an electrical multiple pin connector 38 for interconnecting the module to a vehicle socket which in turn is wired to the vehicle's electrical system as shown in greater detail in FIG. 4 for electrically interconnecting the control module to the vehicle for providing the various selected control functions. In the embodiment shown in FIG. 2, switches 31-35, are two-positioned switches which in a first position, for example, switch 31 allows the unlocking of all of the doors upon actuation of button switch 21 of the transmitter and in the second position unlocks the driver's door upon the first depression of switch 21. Pressing switch 21 again for three seconds will unlock all doors. This door unlocking also can be controlled by a keyboard keyless entry switch pad 15 (FIG. 1) on the vehicle door or by a switch associated with the door lock 17 itself. Switch 32 in a first position locks the doors when the vehicle is put in drive and when in a second position this feature is deactivated. Switch 33 when in a first position unlocks the vehicle doors when the transmission is placed in the park position but such feature can be deactivated by moving the switch into the second position.

Switch 34 provides a delay lock function when in a first position such that the vehicle doors will be locked after a predetermined time delay. This is particularly useful when the vehicle is a van with a sliding side door which receives power for its door operation only when the door is closed. This permits the user to close the door and subsequently lock automatically upon previous actuation of the locking switch either on the transmitter or on the vehicle itself. In the second position of this switch, the delay lock feature is deactivated.

Switch 35 provides a "last door locks all doors" function. When in the first position all doors are locked when the last door of the vehicle is closed. This allows the vehicle driver to effectively control the locking of the vehicle by pressing the lock button located on the door or floor console even when the passengers are still exiting the vehicle. When in the second position deactivates this feature Switch 36 when actuated, places the programmable control module train mode such that when switch 13 is actuated or when a transmitter 20 is activated, the unique driver identification information code or identifying that transmitter is automatically memorized by the control as are the positions of each of the switches 31-35 so that the features selected by these switches are programmed into the control module. Upon training, switch 36 is not used again, unless retraining is desired due to a change of the selected options or upon use by a different driver or transmitter used by a second driver of the vehicle. The control module shown in FIG. 2 shows but a few of the selectable options that can be incorporated in such a system. Other options might, for example, include switches for a variety of seat positions where electrical seats are employed in the vehicle, headrests positioning for electrically or pneumatically driven headrests, express windows, walk-away lighting and other individualized vehicle controls. Naturally, several of the features of the present invention do not require the control of selector switches such as switches 31-36 these features include, for example, the security alarm, and illuminated entry.

Having briefly described the overall system and its relationship to a vehicle, a detailed description of the preferred embodiment of the invention is now presented in connection first with the circuit diagrams of FIGS. 3 and 4 and subsequently the program flow diagrams of the remaining FIGS. 5-14.

Figure 3:
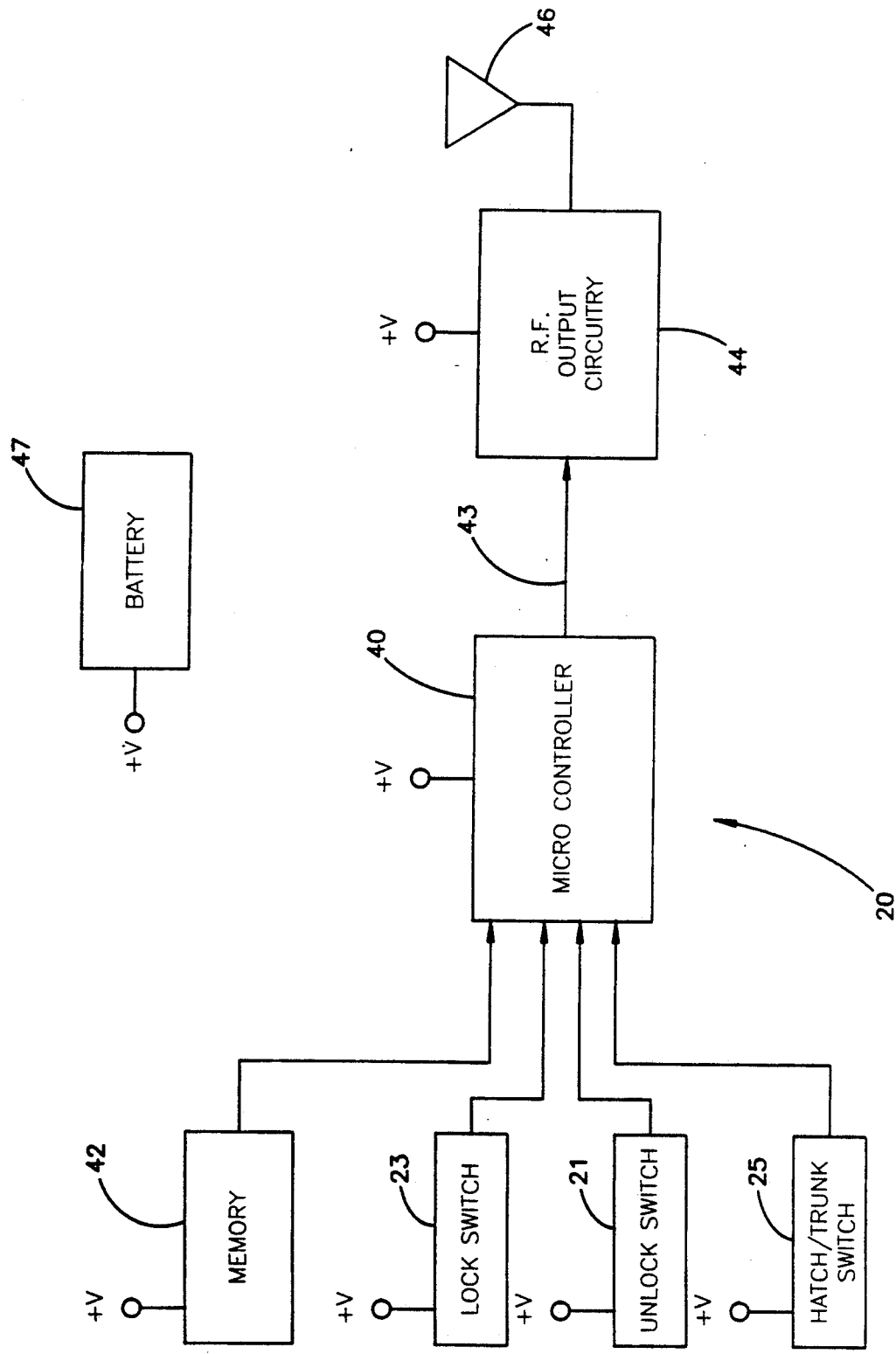
FIG. 3 is a block electrical circuit diagram of a transmitter embodying the present invention.

Referring to FIG. 3, a transmitter 20 is shown, which includes the electrical circuitry shown in FIG. 3 mounted in the housing 28 shown in FIG. 1. The circuit includes switches 21, 23 and 25 which provide a binary logic "0" or "1" output signal to the input of a microcontroller circuit 40 which in the preferred embodiment is a commercially available COP8622C integrated circuit having 1K of ROM memory and 64 bytes of EEROM memory which stores the preprogrammed 18 bit code uniquely identifying the particular transmitter. Power for the microcontroller and its associated memory 42, and switches 21, 23 and 25 and a radio frequency output circuit 44 is provided by a pair of three volt lithium batteries coupled in series as shown by block 47 and which are interconnected to the circuits as indicated by the interconnection +V. The microcontroller responds to the selected actuation of one or more of the switches 21, 23 and 25 to provide a 24 bit serial output data stream at its output conductor 43 which is applied to the input of the radio frequency output circuit 44. Circuit 44 responds thereto to provide a CW modulated radio frequency signal in the preferred embodiment at 315 MHz which is applied to a loop type transmitting antenna 46. The 24 bit serial data stream, includes a first bit constituting a logic level "1" which is employed as a start bit, while bits 2-22 identify the unique code for the transmitter. Bits 23 and 24 provide lock and unlock and panic or security control signals which are demodulated by the control module 30 together with the identification of the transmitter code which is employed in connection with the programming of the control module selectable options.

Figure 4:
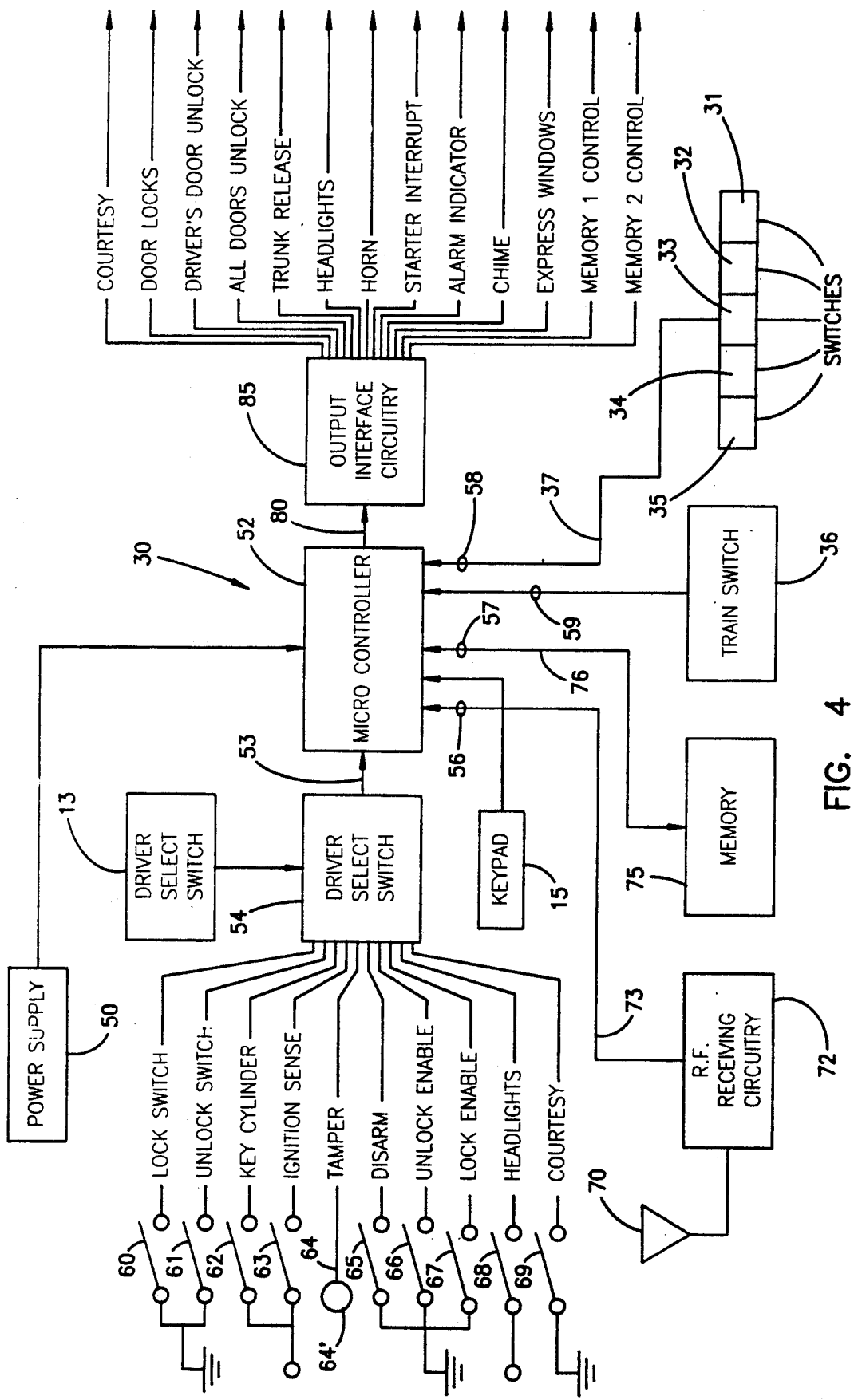
FIG. 4 is an electrical circuit diagram partly in block and schematic form of a receiver and a programmable circuit control embodying the present invention.

The control module 30 is shown in FIG. 4 and includes a 5-volt DC regulated power supply 50 which supplies operating power to the electrical circuits contained therein including a microcontroller 52 comprising a 68HC05P1 integrated circuit chip having 2K ROM memory and 100 bit RAM memory. Coupled to the inputs of microcontroller 52 is an input interface circuit 54 comprising analog logic circuits including conventional resistance capacitance elements for coupling a variety of vehicle mounted switches through parallel inputs 53 of the microcontroller 52.

Thus the interface circuit 54 couples switches 60 and 61 indicating the locked condition of the vehicle doors to provide such information to the microcontroller. It further couples a key cylinder switch 62 to detect the existence of an ignition key to the microcontroller. The ignition-on sensor switch 63 and a motion detecting tamper switch 64 is also coupled to the microcontroller through interface circuit 54. The door key cylinder switch 65 associated with lock 17 (FIG. 1) is also coupled to the microcontroller by circuit 54 as is the unlock and lock enable switches 66 and 67 respectively which are associated with a gear shift lever for providing a park position and a drive position control signal. The headlight-on switch 68 also provides information regarding the headlight activation condition to the microcontroller as does the courtesy lights switch 69. Finally, the driver select switch 13 is also coupled to controller 52 through circuit 54.

All of these input switches provide a binary "0" or "1" through their coupling to ground or +V, depending upon their state of actuation to provide a 10 bit binary signal to the microcontroller on inputs 53 which responds to provide a variety of control functions as described below in connection with the flow diagrams of FIGS. 5-14.

The serial 24 bit data stream transmitted by transmitter is received by a dipole-type receiving antenna 70 and demodulated by a radio frequency receiver 72 tuned to the transmitted frequency of 315 MHz for providing a 24 bit serial data stream on output conductor 73 to the input terminal 56 of microcontroller 52. Microcontroller 52 is also coupled to a non-volatile $E^2$ ROM comprising a 256 bit memory which in the preferred embodiment was an NMC93C06 integrated circuit chip 75 by data link 76 to input terminal 57 of the microcontroller. The data on line 76 comprises 4 bites of 8 bit serial data which comprises user programmed information for the receiver which is controlled by the selectable switches 31-35 which are coupled by a parallel 2 bit data link 37 to input terminal 58 of the microcontroller 52 and training switch 36 coupled to input terminal 59 of microcontroller 52 . The non-volatile memory 75 stores the digital code associated with the transmitter or driver select information from switch 13 which is received during the training mode as described below. Memory 75 also stores 5 bits associated with the selectable switches 31-35 and includes a 6 bit location for a check sum of previous 26 bits, thus providing a total of 32 bits. The 256 bit memory therefore provides eight 32 bit storage areas for up to four users with each user having a backup user code.

The microcontroller includes a parallel output data bus 80 coupled to an output interface circuit 85 comprising a plurality of driver amplifiers such as FET amplifier circuits for providing control output signals. The control output signals are used either directly for controlling vehicle controlled devices such as courtesy lights or for activating existing vehicle controls circuits such as a horn relay, a trunk release relay etc. The various outputs are specifically labeled for the preferred embodiment of the invention, it being understood that circuit 85 comprises a driver circuit of suitable current carrying capacity for each of the output conductors associated with each of the controlled items indicated. Data bus 80, therefore, comprises a parallel data line for each of the controlled outputs such that more than one can be actuated at the same time.

Thus for example, in a security alarm mode actuated either by a signal on the tamper input line 64 or by depression of two of the transmitter switches 21 and 23 at the same time, both the headlights and horn outputs shown in circuit 85 will be actuated intermittently under the control of the microcontroller 52 in response to input signals indicating an alarm condition. The tamper input line can conveniently utilize the sensing of current through the vehicles trunk or hood lights or the interior courtesy lights such that a signal is developed on line 64 indicating one of the lights is actuated thereby indicating unauthorized access to the vehicle. The current sensing line is schematically represented by current source 64'. It is to be understood that a tamper signal could be developed in a number of manners including by coupling a resistor in series with the various vehicle lamps such that as current is applied to the lamps a detectable voltage drop exists across the current sensing resistor. The programming of the control module 30, which may or may not include a receiver, to respond to the transmitted unique code associated with each transmitter, inputs 60-69, the transmitted switch code from the transmitter, as well as inputs from switches 13 and 31-36 is now described in conjunction with the program flow diagrams associated with the control module which includes FIGS. 5-13 inclusively.

Figure 5A:
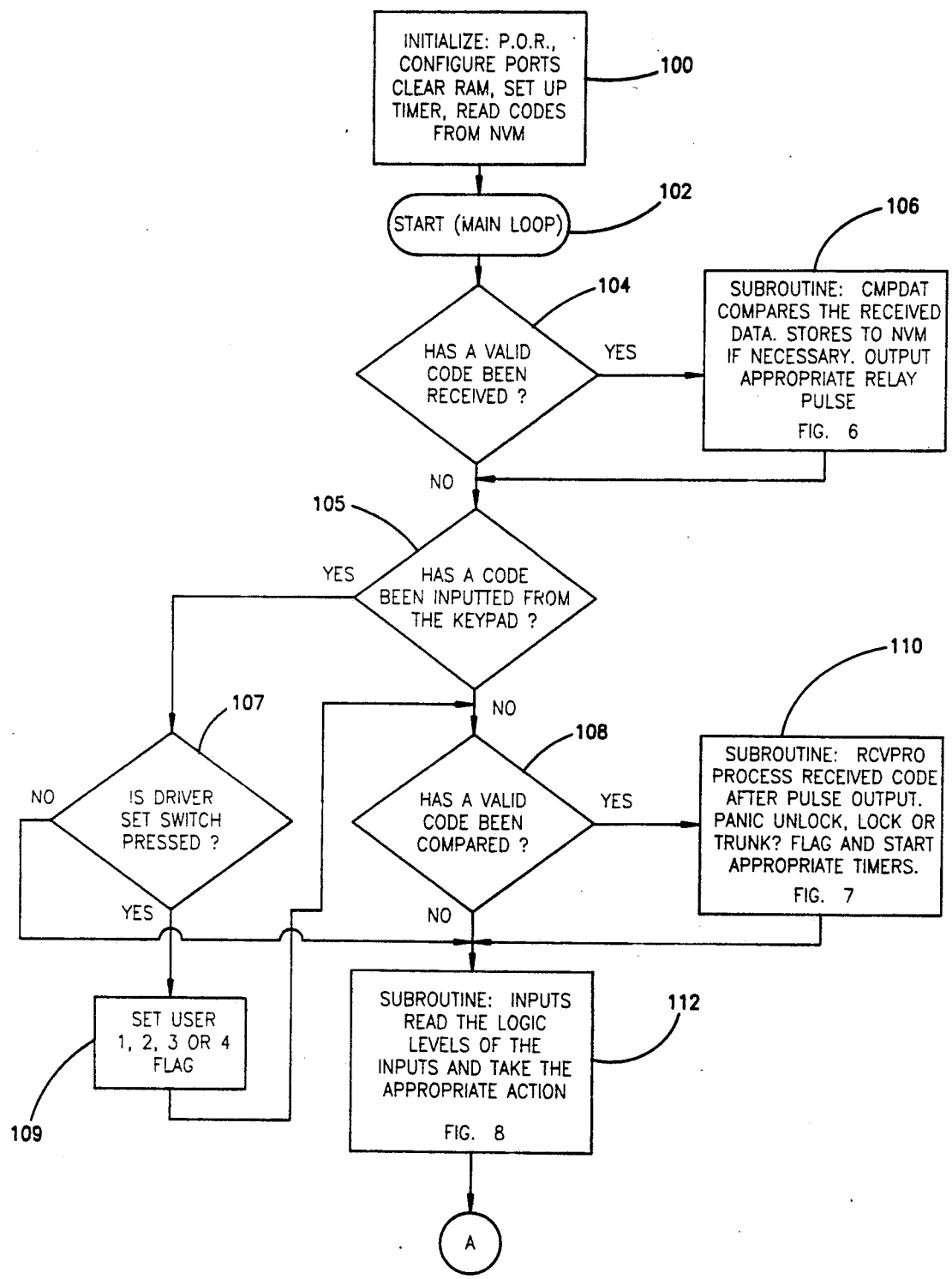
FIGS. 5A and 5B are a flow diagram of the main program employed in the microcontroller of the receiver and programmable control circuit.
Figure 5B:
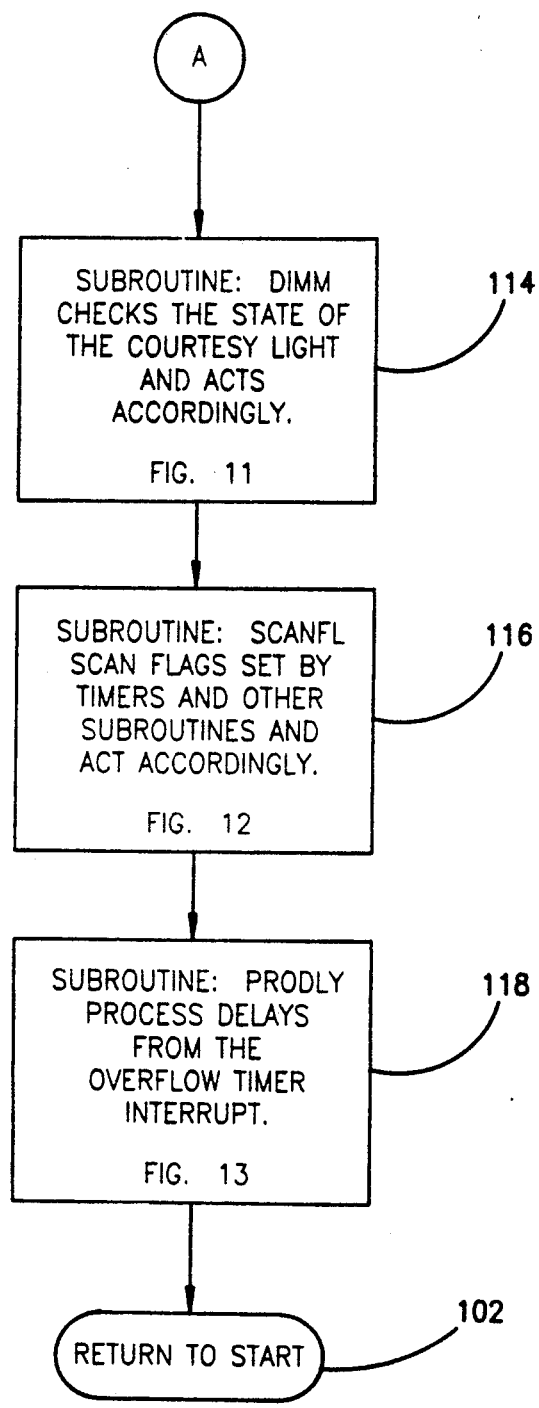

The main program for microcontroller 52 is show in FIGS. 5A and 5B. The program begins with an initialization block 100 in which the input ports are configured, RAM memory is cleared, the timer is started and the codes are read from the non-volatile memory 75. The program is then started as indicated by block 102 and tests for receipt of a valid code is indicated by block 104. A valid code can, if no transmitter is employed, be the output of switch 13 identifying a particular driver and/or the actuating of door lock switch 65. If a valid code has been received, the program goes to a subroutine CMPDAT for comparing the received data with user trained information and outputs an appropriate control signal. The CMPDAT subroutine is shown and described in greater detail in connection with FIGS. 6A and 6B below. If a valid code has not been received as indicated by a negative test by block 104, the program moves to test 105 to determine whether a code has been inputted from the keypad 15. If a code has been inputted from the keypad a test 107 is conducted to determine if the driver select switch has been actuated. If not, the program proceeds to the INPUTS subroutine 112. If it has been, a user identification flag is set as indicated by block 109 and the program proceeds to the INPUTS subroutine through block 108. Once a valid code has either been received or entered by the keyboard, test 108 is run to determine whether a valid code has been compared. If the test indicates it has been, the program goes to a subroutine RCVPRO 110 which is shown in greater detail in FIG. 7A and 7B and which provide a pulse output for providing a controlling function as described in connection with FIG. 7.

Figure 8A:
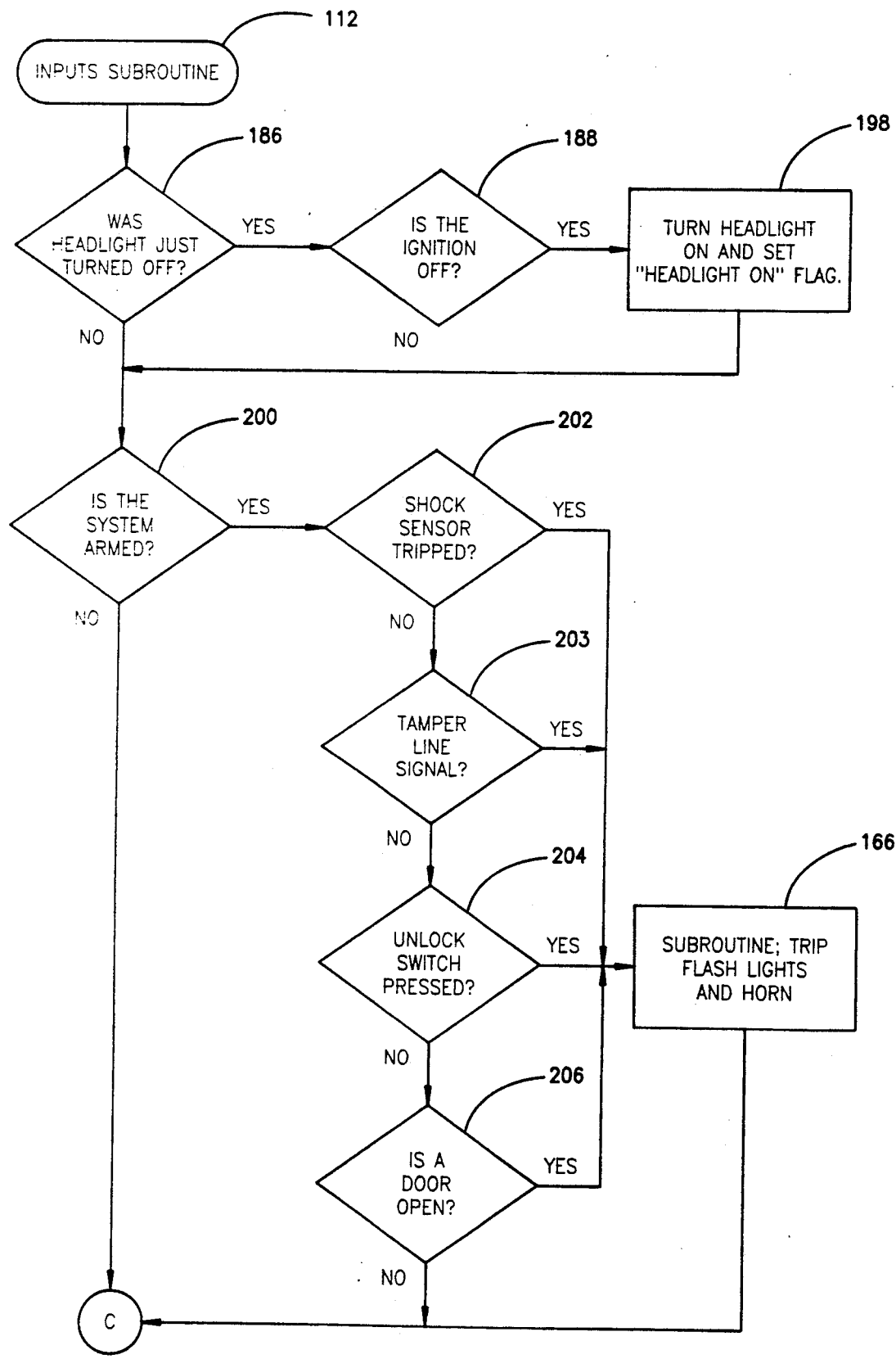
FIGS. 8A and 8B are a flow diagram for yet another program subroutine, shown FIG. 5A.
Figure 8B:
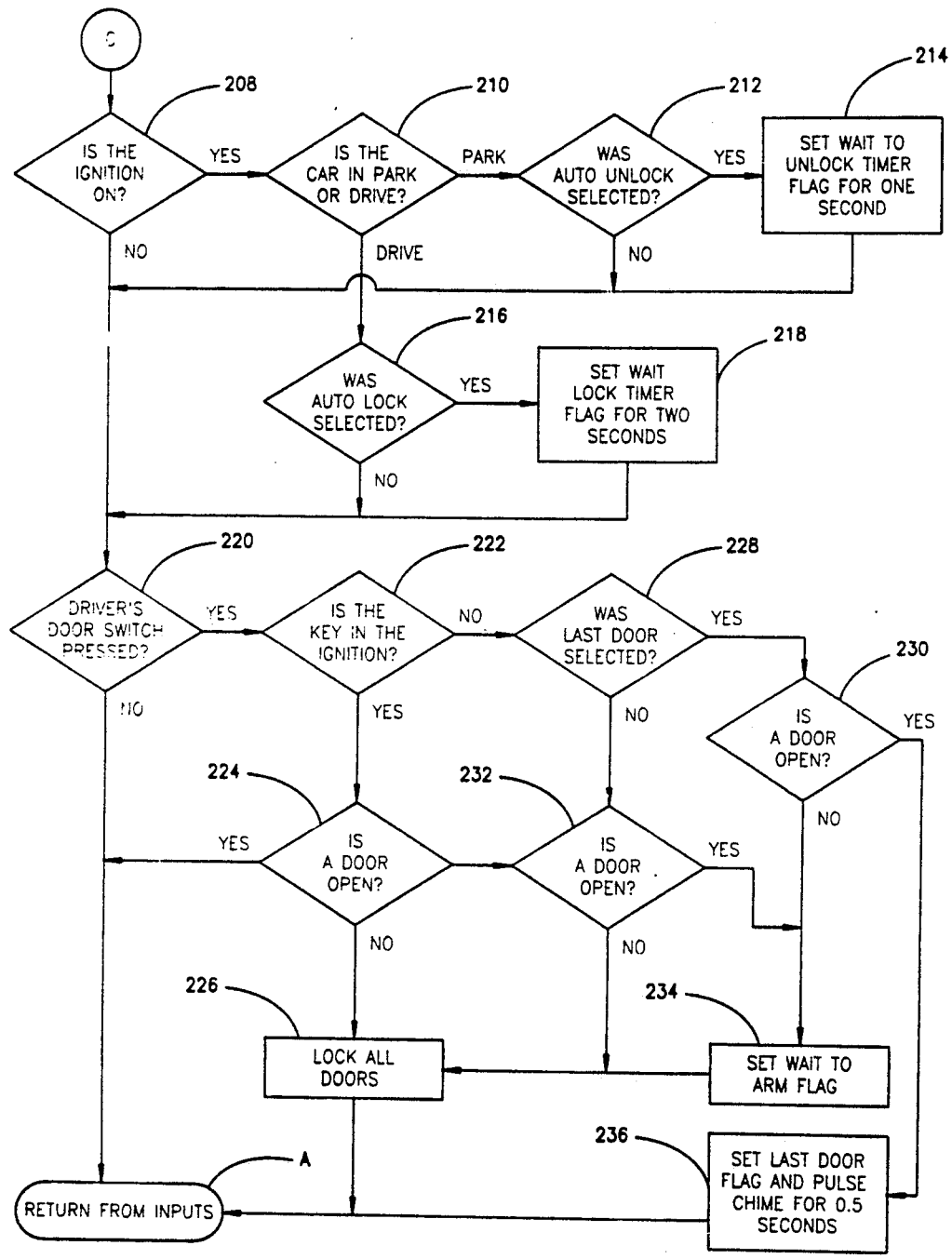
Figure 9:
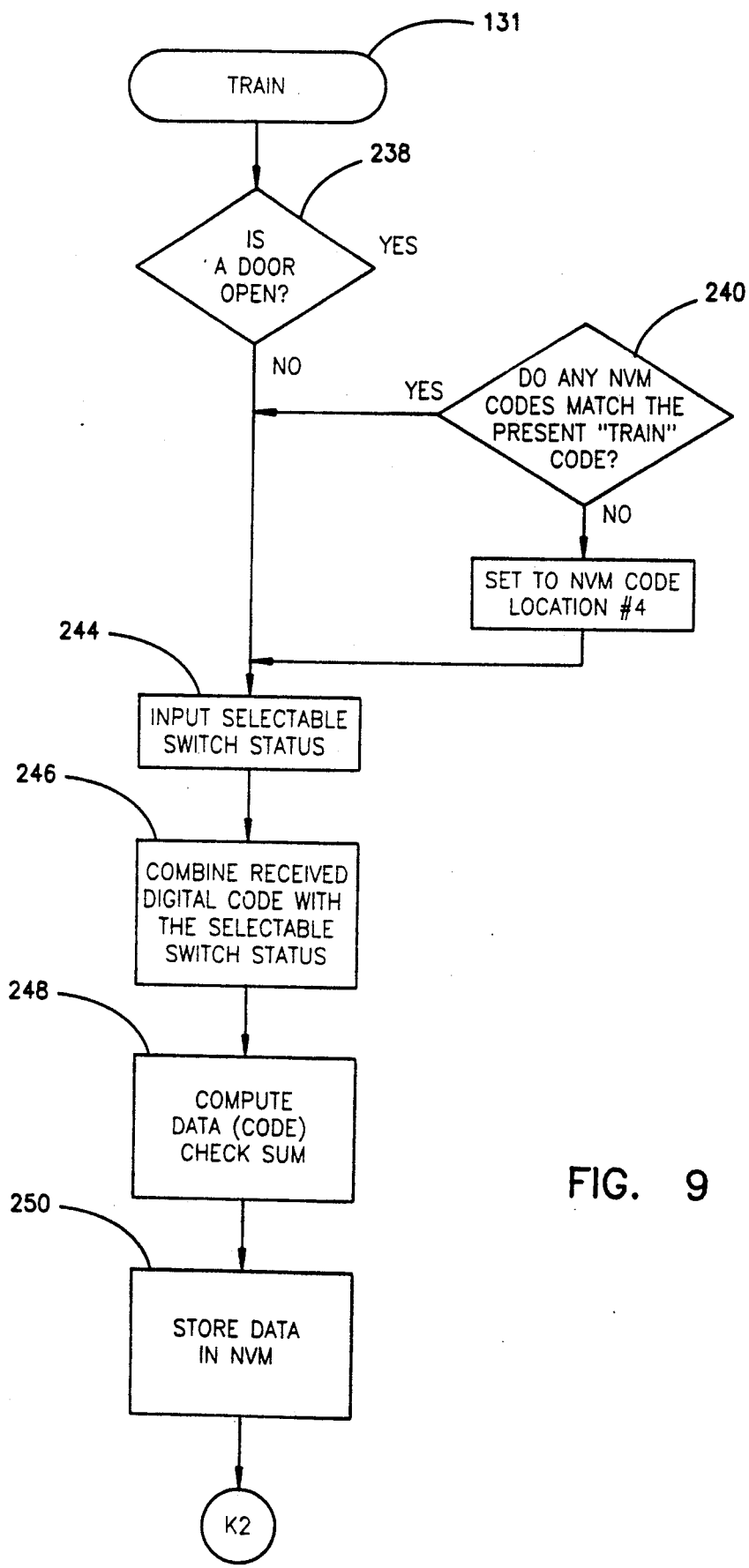
FIGS. 9 is a flow diagram for a program subroutine shown in FIG. 6A.
Figure 11:
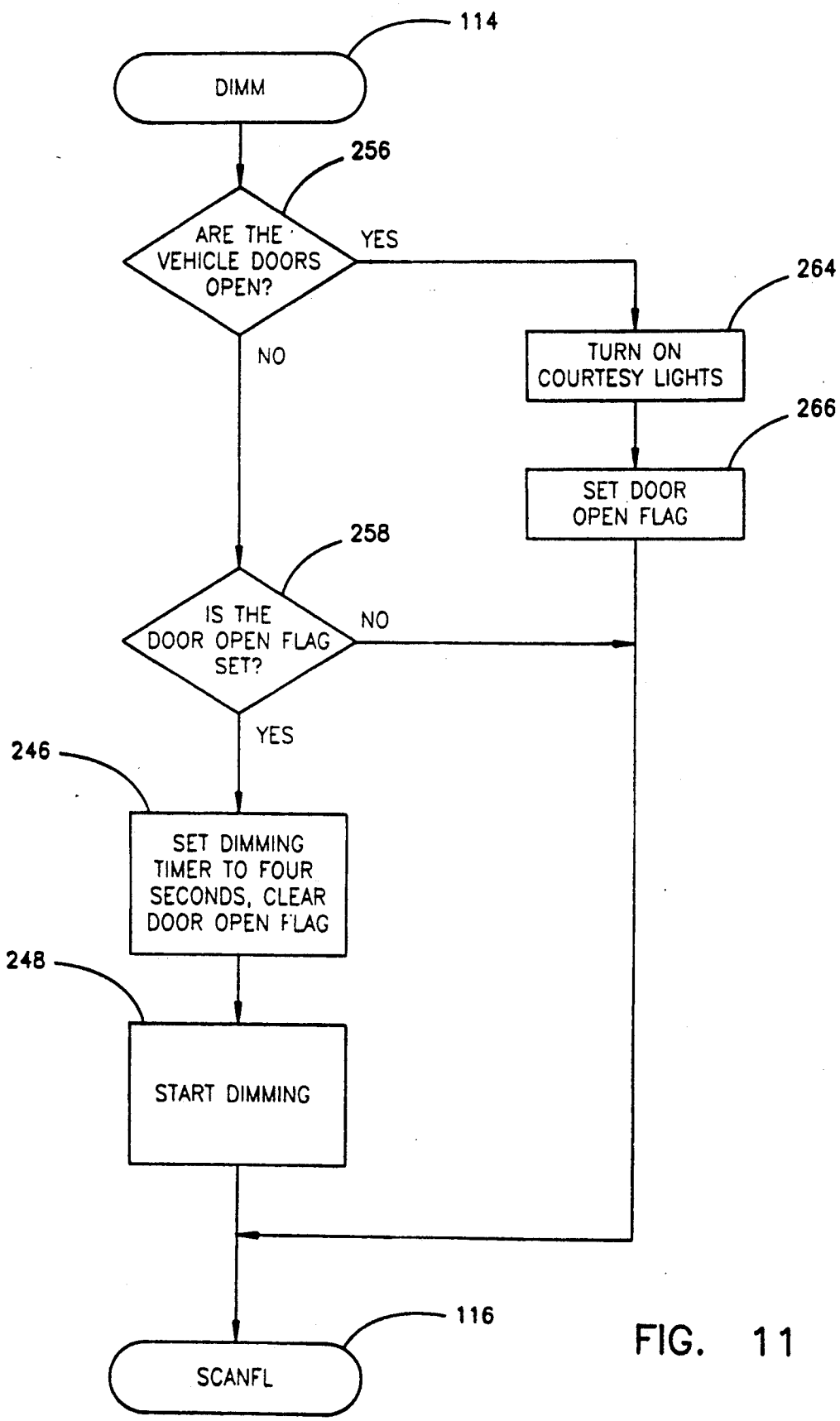
FIG. 11 is a flow diagram for a program subroutine shown in FIG. 5B.
Figure 12:
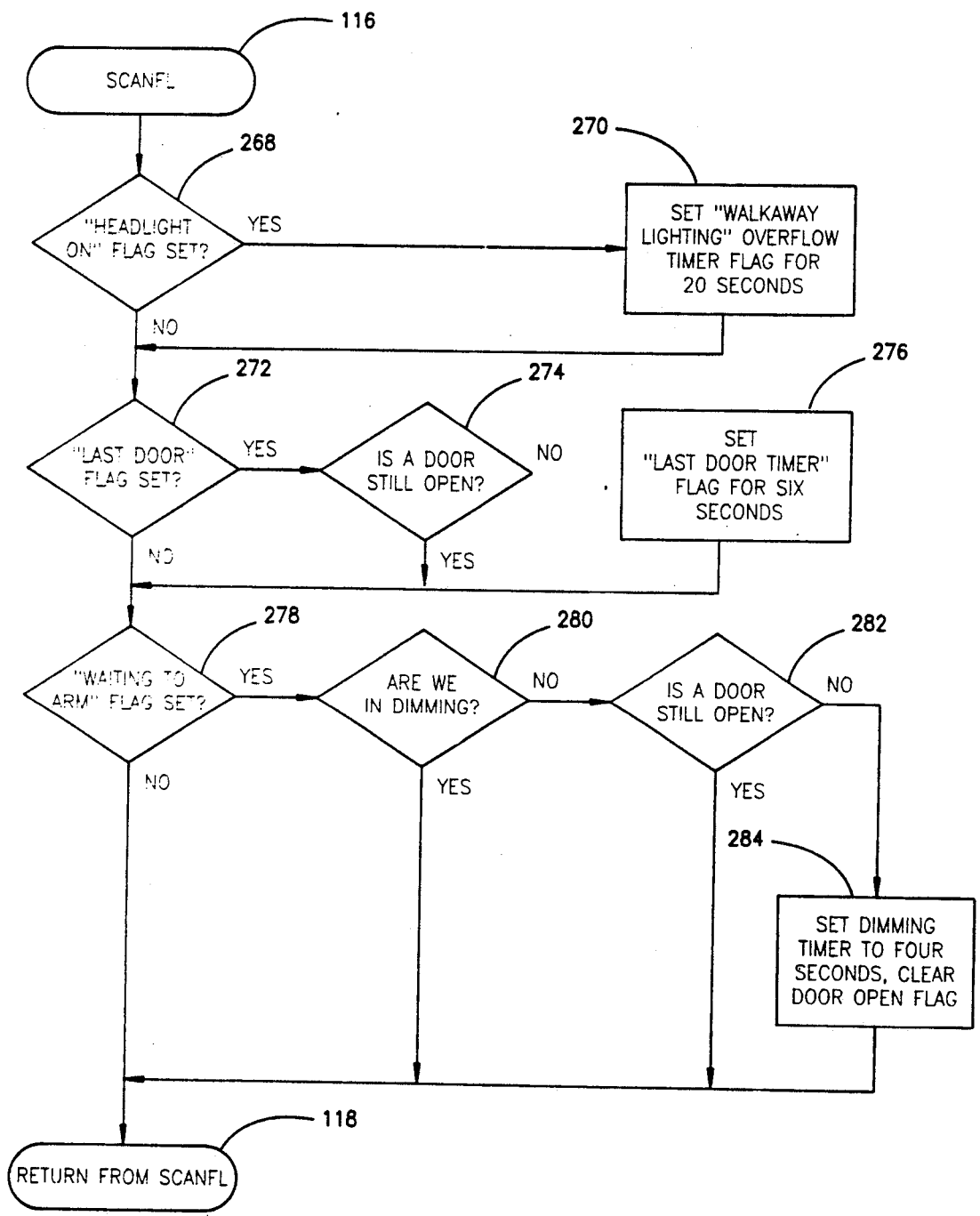
FIG. 12 is a flow diagram for a program subroutine shown in FIG. 5B.

If a valid code has not been compared, the program proceeds directly to an INPUTS subroutine 112 where the input logic levels of the inputs shown in FIG. 4 are determined and appropriate control functions provided as described in connection with FIGS. 8A and 8B below. After the input subroutine, the subroutine DIMM 114 shown in FIG. 11 is called up and which checks the state of the courtesy lights. Subsequently, the SCANFL subroutine 116 looks at the various flags, sets the timers and takes other action as indicated by FIG. 12. The main program then proceeds to block 118 representing the subroutine PRODLY where it processes various delays from the overflow timer interrupt as indicated by the flow diagram of FIG. 13 and returns to the start block 102. The various subroutines typically feedback into the main program at the START input port 102 identified as RTS in the various flow diagrams. Having very briefly described the main loop of the program, a description of each of the subroutines is now presented in connection, first with FIGS. 6A and 6B for the compared data routine.

The CMPDAT subroutine first determines whether there is a valid code inputted from keypad 15 as indicated by block 119. If not, test 120 is conducted. If there was, the user flag identifying the user of such valid code is set as indicated by block 136.

Due to the capability of the system, the transmitter provides consecutive bit streams of the same code and the CMPDAT subroutine 106 determines whether or not the code received is a second code as indicated by block 120. If the second code received is not the second consecutive matching code, the first code received is stored in memory as indicated by block 122 and the second code flag set as indicated by block 124 and the program returns to the START port 102. The program proceeds through the main program and back to subroutine 106. When the second code has been received, as indicated by a "yes" decision in block 120, the second code received is compared to the first code as indicated by test block 126. If the codes do not match then the second received code is stored in the memory as indicated by block 122 and the cycle repeated until a match of two consecutive codes are achieved as indicated by a "yes" decision in block 128. The subroutine then tests to determine whether or not the train switch 36 has been actuated as indicated by block 130. If the train switch is actuated indicated by a "yes" decision of block 130, the program proceeds to a train subroutine shown in FIG. 9 by which the unique transmitter code or driver identification code from switch 13 is stored in the receiver's non-volatile memory 75. The train subroutine is described in greater detail below in connection with FIG. 9.

Figure 6A:
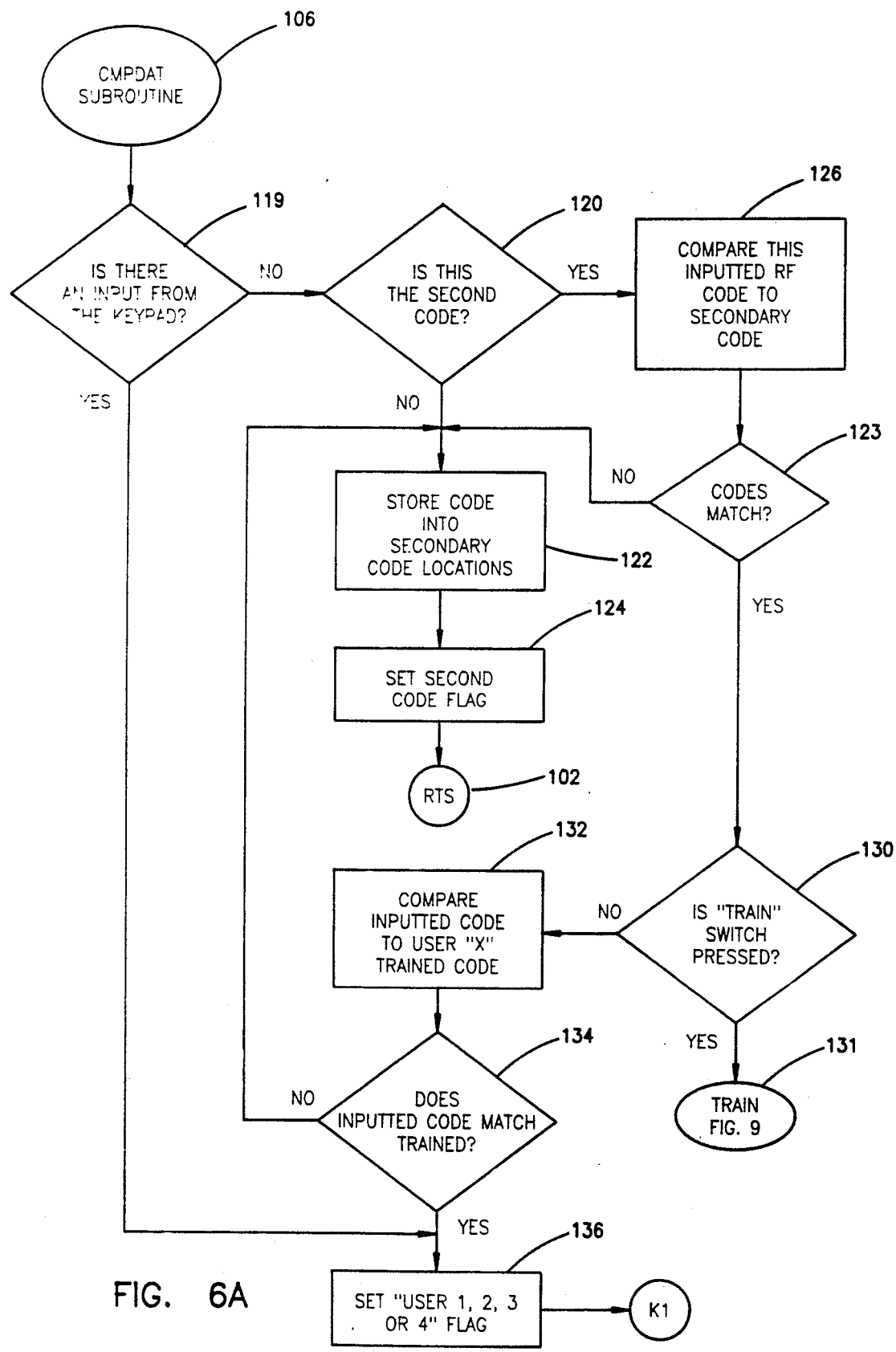
FIGS. 6A and 6B are a flow diagram for one of the program subroutines shown in FIG. 5A.
Figure 6B:
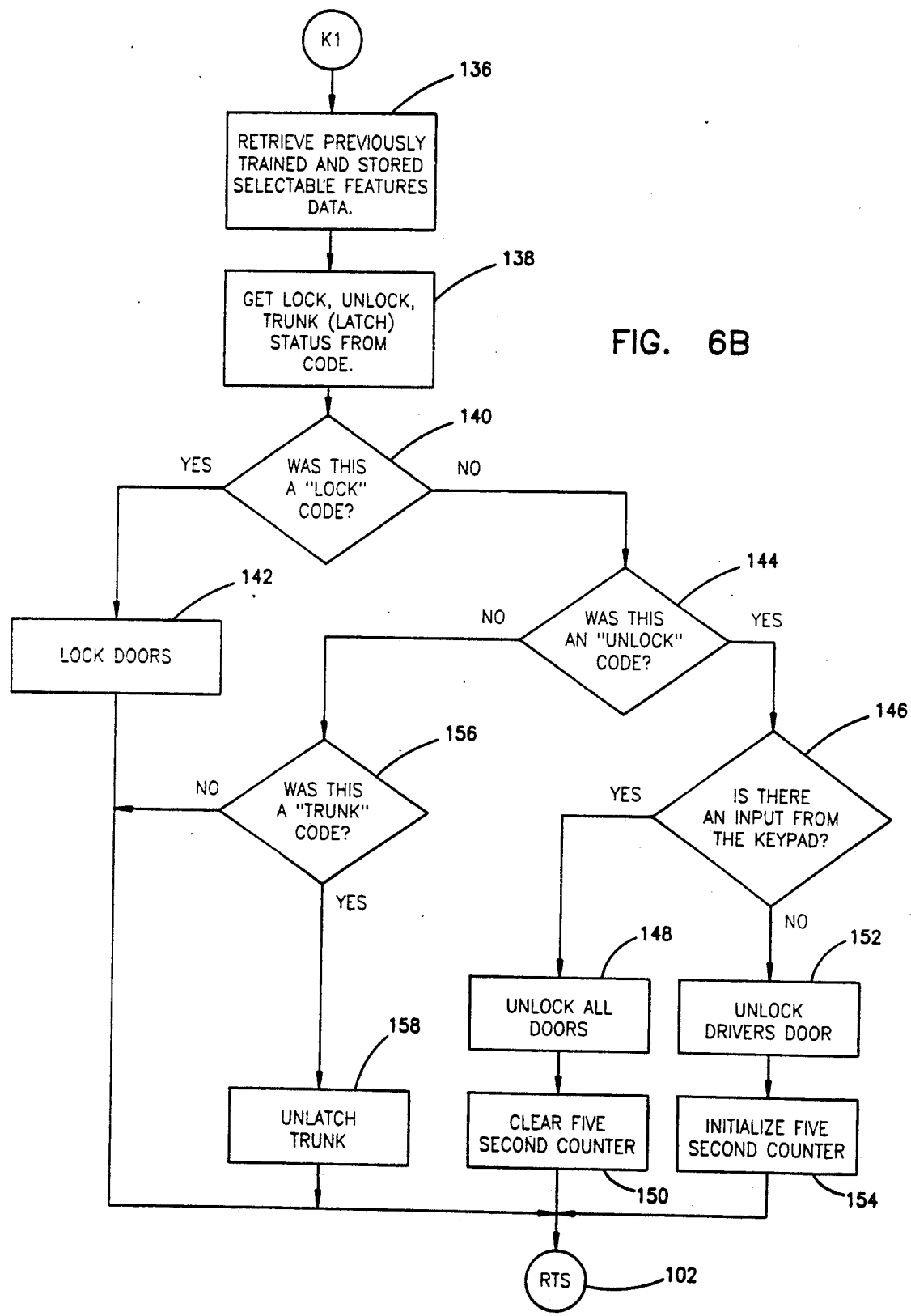
Figure 7A:
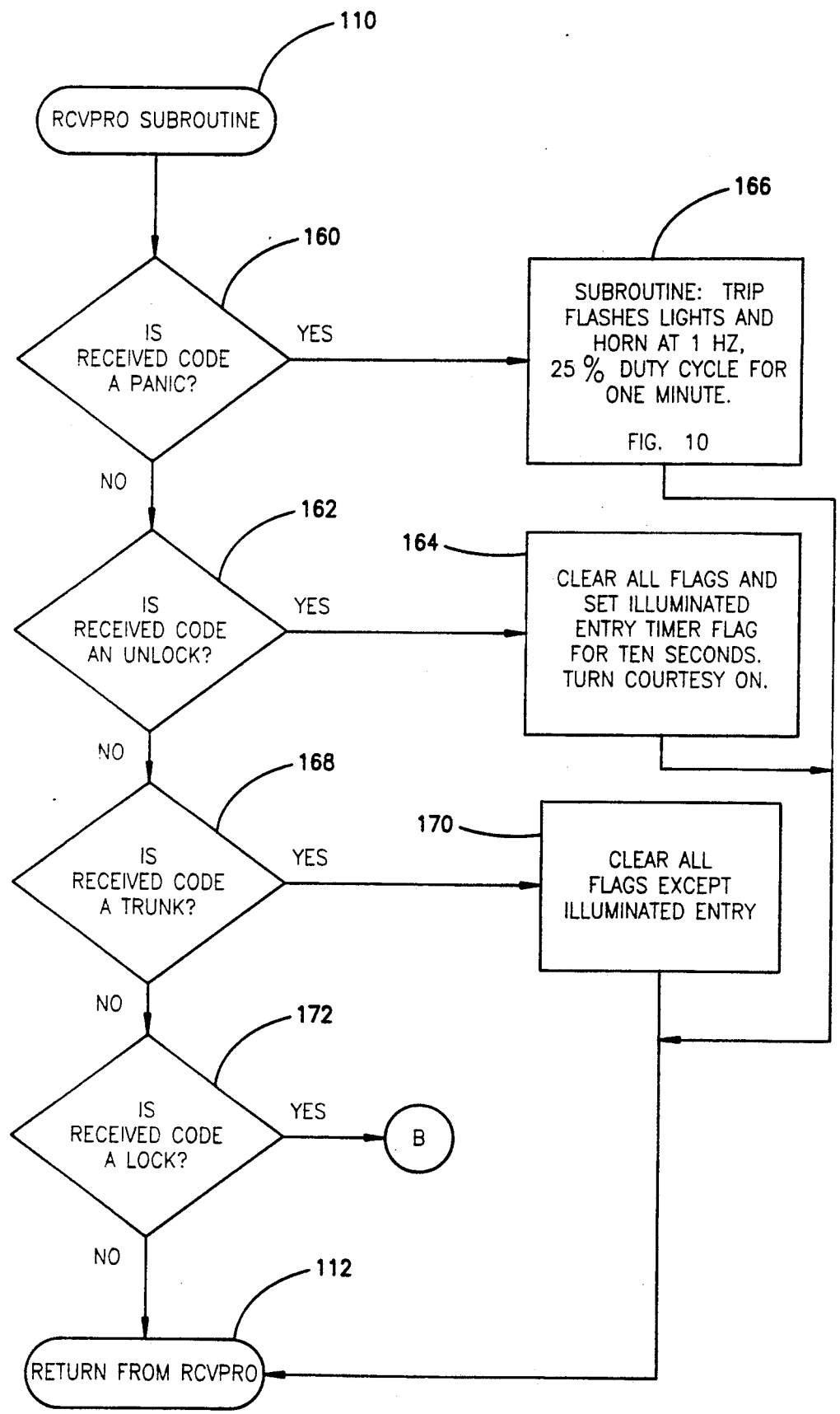
FIGS. 7A and 7B are a flow diagram for another of the program subroutines shown in FIG. 5A.
Figure 7B:
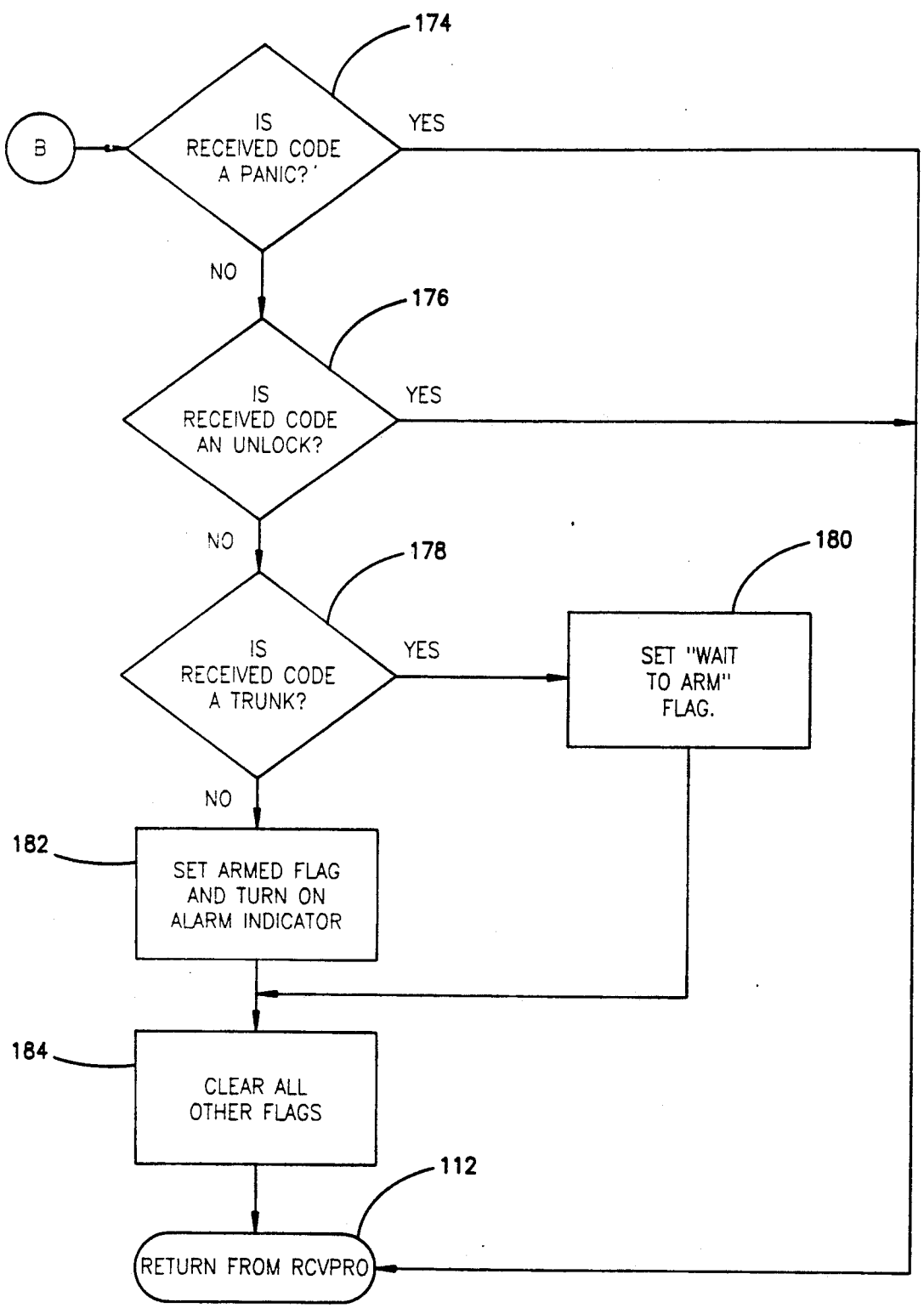

If the train switch is not pressed, thereby indicating that the receiver has already been trained, or untrained and not currently being trained, the subroutine proceeds to block 132 in which the input code is compared to any existing trained code. If a match is detected from the receiver of the keypad as determined by test 134, the user identification flag is set as indicated by block 136. Up to four different vehicle operators or drivers can be identified with the given control and user 1, 2, 3 or 4 identification is set into the program. If the codes do not match, the subroutine proceeds back to the store code block 122. Thus blocks 132-136 compare good i.e. valid driver identification codes to previously trained codes and selects which of the users are providing a valid code. The program then proceeds as indicated in FIG. 6B, to retrieve previously trained and stored selectable features data a indicated by block 136 and obtains the current condition status of the locks which information is stored in the memory.

Next the CMPDAT subroutine determines whether a lock code is being received in addition to the identification code as indicated by block 140 and if yes, as indicated by block 142 a door lock command control is generated. If the "no" lock code is received, the program tests to determine whether or not it was an unlock code as indicated by block 144, if it is an unlock code signal, the program tests as indicated by block 146 to determine whether or not the unlock was inputted within the last five seconds. If it was an unlock all doors control signal is generated a indicated by block 148 and a five second counter cleared as indicated by block 150. If not, the unlocked driver's door control signal is generated as indicated by block 152 and a five second counter is initialized as indicated by block 154. If the code received was not an unlock code nor a lock code, the program tests to determine whether it was a trunk control signal code as indicated by block 156. If not, the program returns to input port 102. If it was, an unlatched trunk control signal 158 is generated. The subroutine portion shown in FIG. 6B therefore retrieves the selectable switch information from switches 31-35 with respect to the switch 32 and provides command control signals according to the receipt of a valid user or transmitter identification code and the detection of one of the three switches on the transmitter i.e. switches 21, 23 or 25 or the actuation of door lock switch 65. Once these tests have been done on the received data from subroutine 110, a test is run as previously indicated by block 110 and which is described in connection with FIG. 7A and 7B.

Subroutine 110 also tests the incoming data to determine whether a panic code has been received as indicated by block 160. A panic code is generated if two buttons on the transmitter 20 are held down for a period of five seconds thereby allowing the five second timer to timeout providing a signal which is determined by test 160. If no panic code is detected, the test 162 determines whether or not the code received was an unlock code and if so clears all flags and sets the illuminated entry timer flag for ten seconds to turn the courtesy lights on as indicated by block 164. If a panic code has been received the subroutine 110 moves to a TRIP subroutine 166 described in connection below with FIG. 10 which is employed for sounding the horn and flashing the lights at approximately 1 Hz for a period of one minute. If the received code is not a panic code nor an unlock code, the subroutine determines whether or not it is a trunk control signal as indicated by test block 168. If it is, all flags are cleared except the illuminated entry control flag as indicated by block 170. If the code received is not a trunk signal the program determines, as indicated by block 172, whether or not it is a lock control signal and if not, the program proceeds to the main program block 112. If the received code is a lock code, the subroutine proceeds to input port B shown in FIG. 7B to determine whether or not the key is in the ignition as indicated by block 174. If it is, the program proceeds to block 112, if not, it determines whether or not the ignition is on as indicated by test 176. This is determined by inputs from the ignition from key switch 63 and ignition sensor switch 64. If the ignition is not on, the program tests for whether or not a door is open as indicated by block 178 which is determined by the closure switch 69 shown in FIG. 4. If the door is open the "wait to arm" flag is set as indicated by block 180. If the door is not open, the arm flag is set as indicated by block 182 and all other flags are cleared as indicated by block 184 and the program returns to block 112 of the main program.

The subroutine as shown in FIG. 7 therefore provides tests to determine whether or not the keys are in the ignition and to prevent the locking of the doors if the keys are in the ignition and control the courtesy lights upon receipt of an unlock signal. The INPUTS subroutine block 112 is now described in connection with FIGS. 8A and 8B.

This subroutine determines the logic level of various inputs and provides control signals for taking appropriate action The first test of the subroutine is to determine whether or not the headlight was just turned off by reading a headlight switch 68 as indicated by block 186, if the headlights were recently turned off the program tests to determine whether the ignition was recently turned off and if so, the headlight-on flag is set as indicated by block 190 and the program determines whether the alarm system is armed as indicated by block 200. The vehicle preferably includes a shock sensor for detecting motion as indicated by switch 65 in FIG. 4 and if armed it determines whether or not the sensor has been activated as indicated by test 202. If it has been, the TRIP subroutine 166 is called up as indicated in FIG. 8A and as described below. If not, test 203 checks to see if there is a tamper signal on line 64 (FIG. 4). If there is, the TRIP subroutine 166 is called up. If not, test 204 is conducted to determine whether the unlock switch is pressed, if not, test 206 is conducted to determine whether a door is open. If a door is open, and the lock has not been pressed, the TRIP subroutine is again called-up as indicated by the "yes" decision of block 206. If not, the subroutines proceeds to input port C shown in FIG. 8B in which a test is conducted to determine whether or not the ignition is on as indicated by block 208. If it is, the park or drive condition of the transmission is tested as determined by block 210 and if in park, a test is conducted to determine whether the auto unlock feature was selected as indicated by the actuation of selector switch 33.

Thus if the car is in park and the switch has been selected, an unlock timer flag is set as indicated by block 214. If the parked car is in drive, however, as indicated by a decision in block 210, block 216 tests to determine if the auto lock selector switch 32 is set and if so, sets a "wait to lock" flag as indicated by block 218 with a two second delay. The program then tests to determine if the driver's locking switch is actuated as indicated by block 220 and if so, is the key in the ignition as indicated by block 222. If it is, the test determines whether the door is open as indicated by block 224 and if not, the lock all doors control command is generated as indicated by block 226.

The courtesy light circuit including door actuated switches 69 (FIG. 4) is a convenient testing means for determining if any of the doors are open. If the key is not in the ignition the program tests to determine if the last door closed feature was selected by the actuation of switch 35 as indicated by test 228. If yes, a test as to whether or not any doors are open is conducted as indicated by block 230 and if not, the "lock all doors" command 226 is generated.

This occurs after a predetermined time delay including the two second delay of block 218. Last door closed signal, as can be appreciated, is the same as an all door closed signal when the courtesy lights are extinguished. If the last door closed feature was not selected, it tests again whether a door is open as indicated by block 232 and if not, all doors are locked as indicated by block 226, if yes, an alarm flag is set as indicated by arm flag 234. If the door is open as indicated by block 230, the last door flag is set as indicated by block 236 and the vehicle chime is pulsed as indicated also by block 236 and the program proceeds to input port A of FIG. 5B.

Before discussing the remaining subroutine of the main program, a description follows of the training subroutine in FIGS. 9A and 9B and the TRIP subroutine which activates the vehicle alarm in the case of attempted theft or actuation of two or more switches of transmitter 20 for a period of five seconds.

The TRAIN subroutine 131 is shown in FIGS. 9A and 9B and is employed to initially train a receiver to accommodate a transmitter for its first operation, additional transmitters, or replacement transmitters. Initially the subroutine looks to determine if there are any available non-volatile code locations in memory 75 as indicated by test block 238. If there are none, test 240 is run to determine whether or not the received code matches any of the codes in the non-volatile memory. If not, the received code is set to code location as indicated by block 242. If there are open non-volatile code locations, the subroutine tests for the input selectable switch status as indicated by block 244 to determine the status of the various selectable switches 31-35. As indicated by block 244, the program combines the inputted RF code with the selectable switch status as indicated by block 246 and computes a 32 bit code for non-volatile memory 75 corresponding to the received code, the data from the selectable switches and the check sum last 6 bits and stores such data a indicated in block 248 and stores the data in the non-volatile memory 75 of FIG. 4 as indicated by block 250. The train subroutine shown in FIGS. 9A and 9B is enacted only when the train switch has been actuated by the actuation of switch 36. Upon receipt of the code and its subsequent successful storage in memory, the vehicle chime is sounded as indicated by block 252, and the program returns to input port 102.

Figure 10:
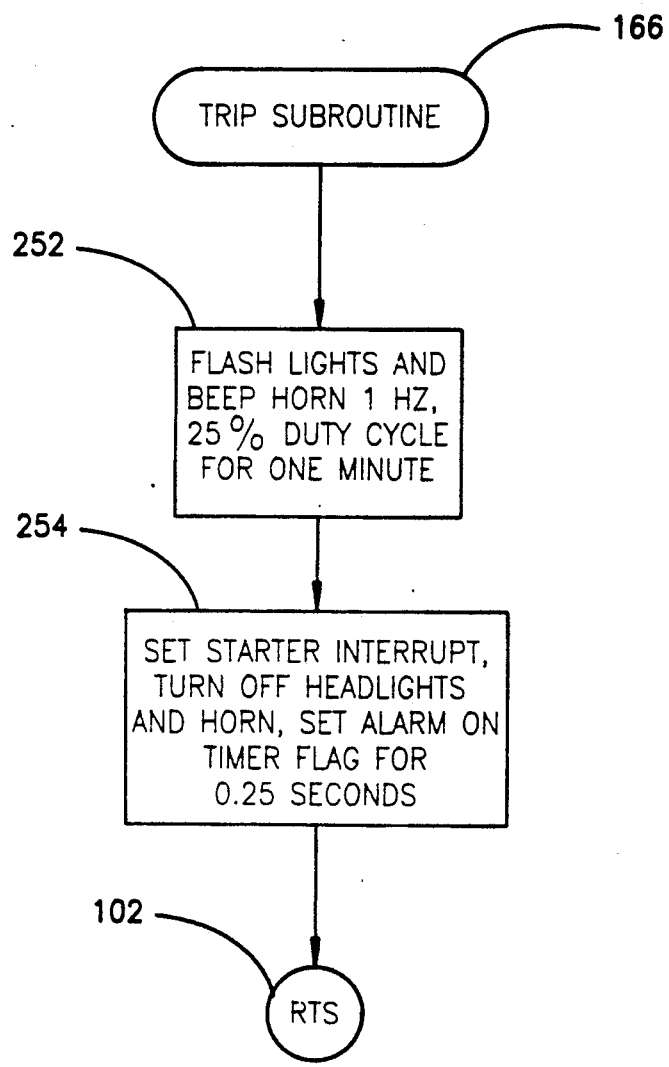
FIG. 10 is a flow diagram for a program subroutine shown in FIG. 7A.

The TRIP subroutine 166 is shown is FIG. 10 and is activated upon the receipt of a signal from the tamper switch 64 or a test indicating two of the transmitter switches are depressed for over five seconds. The TRIP subroutine provides a control signal as indicated by block 252 which flashes the lights and actuates the horn at a 1 Hz 25% duty cycle for a period of one minute. After one minute, the subroutine as indicated by block 254, interrupts the starter, turns off the headlights and the horn, and sets the alarm on timer flag and the program returns to port 102. To deactivate the alarm, the unlock switch 21 or trunk switch 25 is pushed on the remote transmitter.

Returning now to the main program and particularly the subroutine 114 which is described in detail in FIG. 11, a DIMM subroutine 114 tests whether a vehicle door is open (block 256) and if one is, as indicated by block 264, the courtesy lights are turned on and a door open flag is set as indicated by block 266. The program then proceeds to the SCANFL subroutine 116.

If no door is open, a test is conducted to check if the door open flag is set as indicated by block 258. If no flag is set, the door has been closed and the program proceeds to SCANFL. If the door open flag is set as indicated by block 260, a dimming control counter is enabled to cause the courtesy lights to gradually dim a indicated by block 262 and the program returns to the main program to subroutine 116. This subroutine is actuated as noted earlier in connection with the main program prior to unlocking of a vehicle door remotely.

The SCANFL subroutine 116 is shown in FIG. 12 and scans all the program flags beginning with the headlight-on flag as indicated by block 268. If the headlight flag has been set, a 20 second timer is set to control the shutting off of the headlights 20 seconds after the vehicle has been locked. If the headlight flag is not set it tests, as indicated by block 272, whether or not the last door flag is set. If it has been set it tests as indicated by block 274, whether a door is still open and if not, the last door timer flag is set for six seconds as indicated by block 276. If the last door flag has not been set or if a door is still open, a test to determine if the "wait to arm" flag is set as indicated by block 278. If not, the program proceeds to subroutine 118 shown in FIG. 13. If the "wait to arm" flag has been set, the program tests to determine whether the courtesy lights are in the dimming mode as indicated by block 280 and if yes, proceeds to subroutine 118. If not, the program tests to determine whether a door is open and if yes, returns to the next subroutine 118. If not, as indicated by block 284, the arm flag is set and turns an alarm indicator actuated to indicate that the vehicle anti-theft alarm has been set.

Figure 13A:
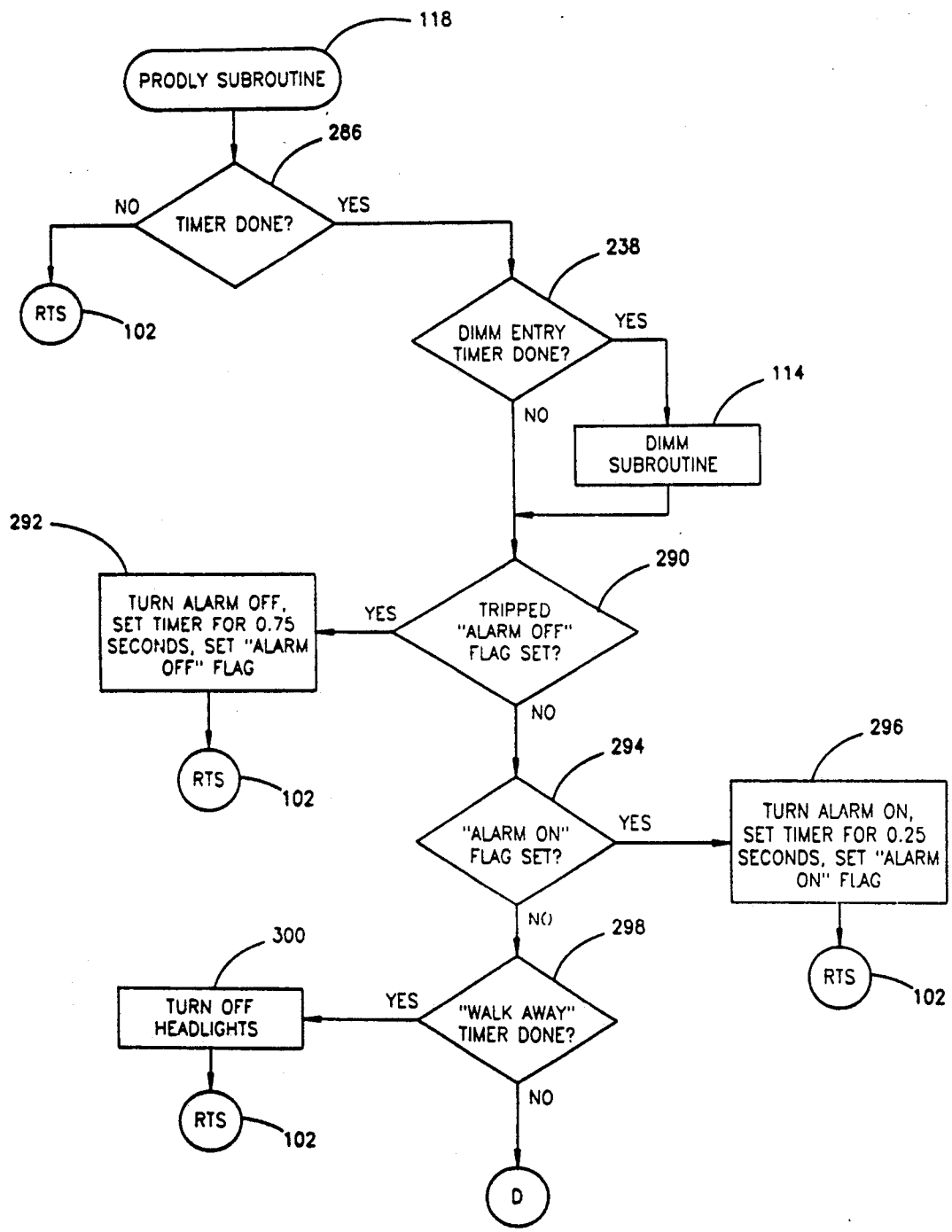
FIGS. 13A and 13B are a flow diagram for another program subroutine shown in FIG. 5B.
Figure 13B:
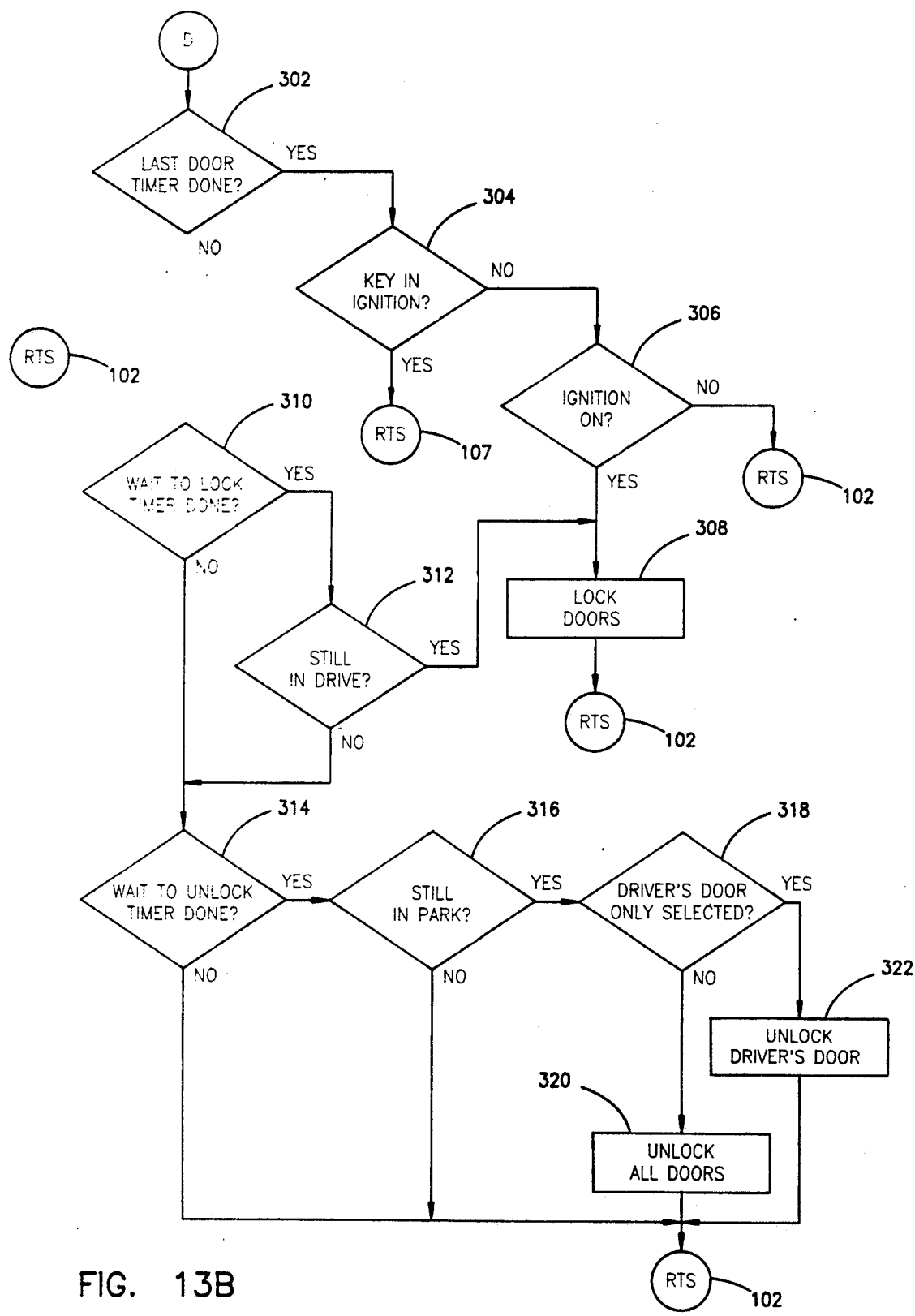

The final subroutine (PRODLY) associated with the control module 30 processes the various delay timers and is shown in FIGS. 13A and 13B. This subroutine tests the timers to determine whether they timed out as indicated by block 286. The DIMM timer is tested as indicated by block 288 and if it is timed out, the DIMM subroutine 114 is called up. If not, the alarm off flag is tested as indicated by block 290 and if this flag is set, the alarm is turned off and the alarm off flag is set as indicated by block 292 and the program proceeds to input port 102. If the alarm off flag is not set, the alarm on flag is set as indicated by block 294 and the alarm is activated as indicated by block 296 and the program returns to port 102. If alarm flag is not set, a walk-away timer is tested as determined by block 298 and if it is timed out, the headlights are turned off as indicated by block 300 and then the program proceeds to port 102. If not, the subroutine proceeds to input port D of FIG. 13B to determine whether or not the last door timer has timed out as indicated by block 302. If it has, test 304 is conducted to determine whether or not the key is in the ignition. If it is, the program proceeds to block 107, if not, a test is conducted to determine whether the ignition is "on? as indicated by block 306. If not, the program proceeds to block 102. If the ignition is on and the doors are locked as indicated by block 308 the program also proceeds to port 102. If the last door timer is not turned off, however, as indicated by a negative decision in block 302, the "wait to lock" timer is tested as indicated by block 310 to determine if it has timed out. If it has, a test to determine whether the vehicle is still in drive is conducted as indicated by block 312. If it is, the locked door control 308 is activated. If not, the program loops through the tests to determine whether or not the unlocked timer was timed out as indicated by block 314. If it hasn't, the program proceeds to input port 102. If it has, the program tests to determine if the vehicle is in park as indicated by test 316. If it is not in park the program proceeds to port 102. If it is in park, the program proceeds to determine if the driver's only unlock switch has been selected as indicated by block 318. If not, the unlock all doors command is generated as indicated by block 320 otherwise the unlock the driver's door command is generated as indicated by block 322.

After either of these commands are generated the program proceeds to block 102.

As can be appreciated, the particular software for testing the various code inputs as well as hardwired inputs associated with the control can be varied depending upon the methodology employed by the particular programmer. The program described is exemplary only and provides for the status testing of the various control systems as well as input commands for the particular features selected and sets control flags for providing output control signals in a particular sequence.

Figure 14:
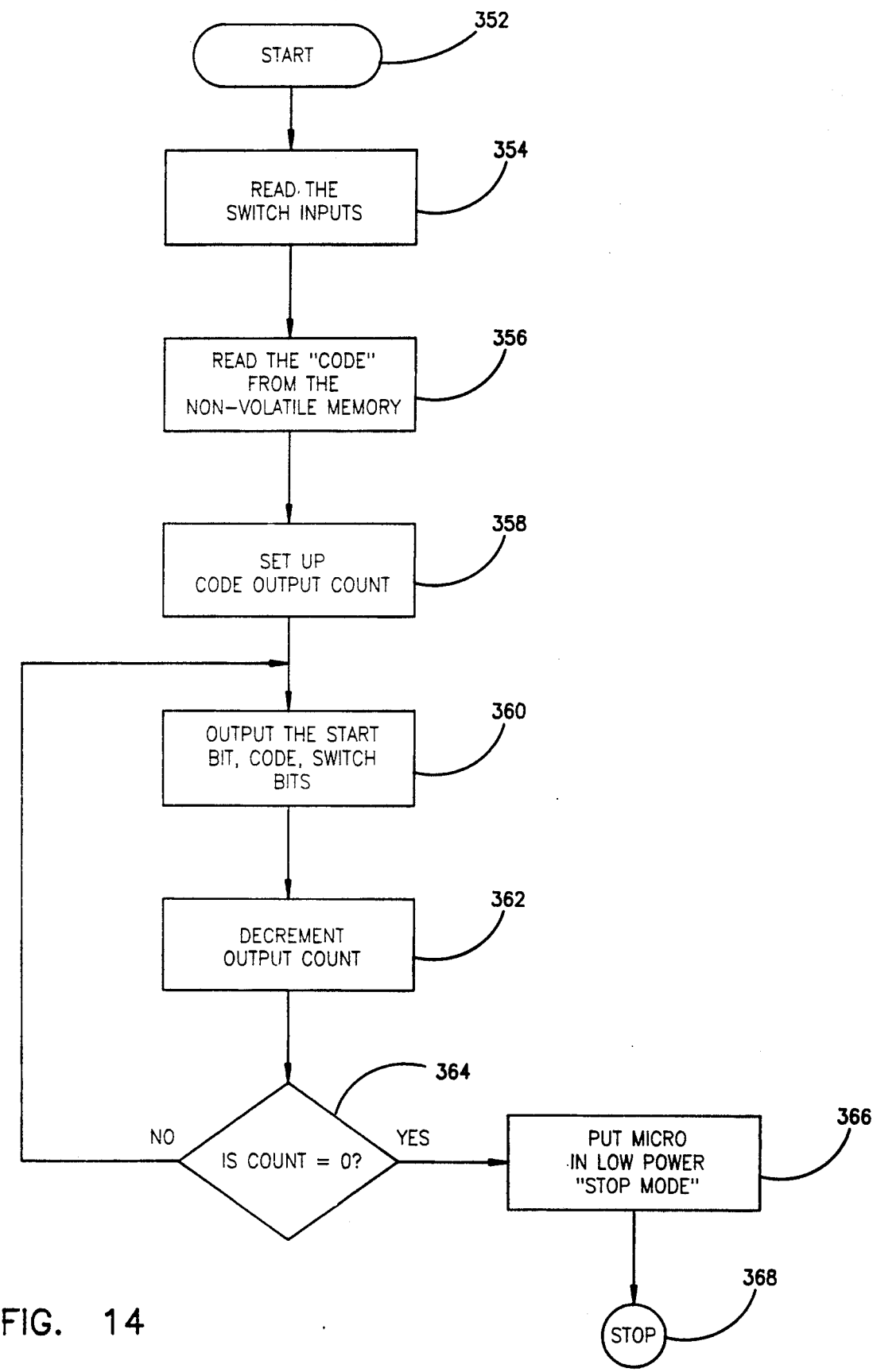
FIG. 14 is a flow diagram for the program for the transmitter microcontroller.

The transmitter flow diagram is set forth in FIG. 14 and provides for the control of the microprocessor and controller 40 in conjunction with memory 32 to provide the unique code for the identification of the transmitter to a receiver as well as the condition of the various switches selected by the operator in conjunction with the operation of the transmitter and is now described.

When the systems embody a transmitter 20 for activation of the operator selected control features, the program shown in FIG. 14 is employed for controlling the flow of data to and from the microcontroller 40. The program indicated as 350 in FIG. 14 includes a start block 352 which tests for the actuation of any of the switches. The start block initiates the program sequence upon the actuation of any of the transmitter buttons and shifts the microcontroller from a low power or stop mode to an operational mode. As indicated by block 354 the microcontroller looks at switch inputs for switches 21, 23 and 25 and reads the operator unique code as indicated by block 356 from the non-volatile memory 42. Depending on which switch is actuated, the program sets up the output code for the selected switch as indicated by block 358 and sequentially outputs the start bit, the code bit and the switch indicative bits as indicated by block 360. The program counter then decrements the output code, as indicated by block 362 until it reaches 0 as indicated by test 364. When it reaches 0, the microcontroller is returned to a low power operational mode as indicated by block 366 and the program stops as indicated by block 368 until another transmitter switch is actuated, which again initiates the sequence at block 352.

It will be apparent to those skilled in the art that various modifications to the preferred embodiment described herein can be made without departing from the spirit or scope of the invention as defined by the appended claims.

The embodiments of the invention in which an exclusive property or privilege is claimed are defined as follows.

1. A vehicle door locking system comprising:
 a plurality of electrically actuated vehicle door locks for a vehicle;
 means for detecting the closure status of the vehicle doors, said means detecting that all the vehicle doors are closed;
 input circuit means for controlling said door locks; and
 a microcontroller coupled to said door locks, to said detecting means and to said input circuit means, said microcontroller responsive to input signals from said input circuit means for locking all doors of the vehicle, wherein when one of said input signals is received from said input circuit means when at least one of said vehicle doors is open, said microcontroller is responsive to said one of said input signals to lock all doors of the vehicle a predetermined time period after said detecting means detects that all doors have been closed.

2. The system as defined in claim 1 wherein said input circuit means includes an operator actuator switch.

* * * * *

UNITED STATES PATENT AND TRADEMARK OFFICE
CERTIFICATE OF CORRECTION

PATENT NO. : 5,113,182

DATED : May 12, 1992

INVENTOR(S) : Michael J. Suman et al.

It is certified that error appears in the above-identified patent and that said Letters Patent is hereby corrected as shown below:

```
Column 1, line 25:
After "remotely" insert --controlled--;

Column 1, line 29:
"o secure" should be --of secure--;

Column 1, line 61:
"o the" should be --on the--;

Column 2, line 65:
"FIGS. 9" should be --FIG. 9--;

Column 3, line 54:
"is logic" should be --is a logic--;

Column 5, line 2:
After "feature" insert --.--;

Column 8, line 64:
"data a" should be --data as--;

Column 9, line 9:
"generated a" should be --generated as--;
```

UNITED STATES PATENT AND TRADEMARK OFFICE
CERTIFICATE OF CORRECTION

PATENT NO. : 5,113,182

DATED : May 12, 1992

INVENTOR(S) : Michael J. Suman et al.

It is certified that error appears in the above-identified patent and that said Letters Patent is hereby corrected as shown below:

Column 10, line 10:
After "action" insert --.--;

Column 11, line 7:
"FIGS. 9A and 9B" should be --FIG. 9--;

Column 11, lines 11 and 12:
"FIGS. 9A and 9B" should be --FIG. 9--;

Column 11, line 30:
"a indicated" should be --as indicated--;

Column 11, line 33:
"FIGS. 9A and 9B" should be --FIG. 9--;

Column 11, line 64:
"dim a" should be --dim as--;

Column 12, line 48:
""on?" should be --"on"--.

Signed and Sealed this

Second Day of November, 1993

Attest:

BRUCE LEHMAN

Attesting Officer

Commissioner of Patents and Trademarks

REEXAMINATION CERTIFICATE (2722th)
United States Patent [19]
Suman et al.

[11] B1 5,113,182

[45] Certificate Issued Nov. 7, 1995

[54] VEHICLE DOOR LOCKING SYSTEM DETECTING THAT ALL DOORS ARE CLOSED

[75] Inventors: Michael J. Suman, Holland; Mark L. Zeinstra, Grandville, both of Mich.

[73] Assignee: Prince Corporation, Holland, Mich.

Reexamination Request:
No. 90/003,613, Oct. 21, 1994

Reexamination Certificate for:
Patent No.: 5,113,182
Issued: May 12, 1992
Appl. No.: 467,541
Filed: Jan. 19, 1990

Certificate of Correction issued Nov. 2, 1993.

[51] Int. Cl.$^6$ .................................................. H04Q 1/00
[52] U.S. Cl. .................... 340/825.31; 340/825.32; 340/426; 307/10.2
[58] Field of Search ............... 340/825.31, 825.32, 340/825.69, 825.72, 426, 428, 457.2, 528; 307/10.2, 10.3, 10.4; 180/286, 287; 70/256, 257; 361/172

[56] References Cited

U.S. PATENT DOCUMENTS 4,486,806   12/1984   Mochida et al. .................. 361/172

FOREIGN PATENT DOCUMENTS 63-226475   9/1988   Japan .

OTHER PUBLICATIONS

Ford Engineering Specification No. ES-F2UB-14A093-AA, May 1988.

*Primary Examiner*—Donald J. Yusko
*Attorney, Agent, or Firm*—Christopher M. Brock; Harness, Dickey & Pierce

[57] ABSTRACT

A vehicle control system includes a microcontroller based switch programmable module which allows a variety of different vehicle options to be selectively actuated by different vehicle users. In one embodiment a remote transmitter provides a unique user code and the control system includes the capability of programming the transmitter code to allow use of multiple transmitters with different codes for different users.

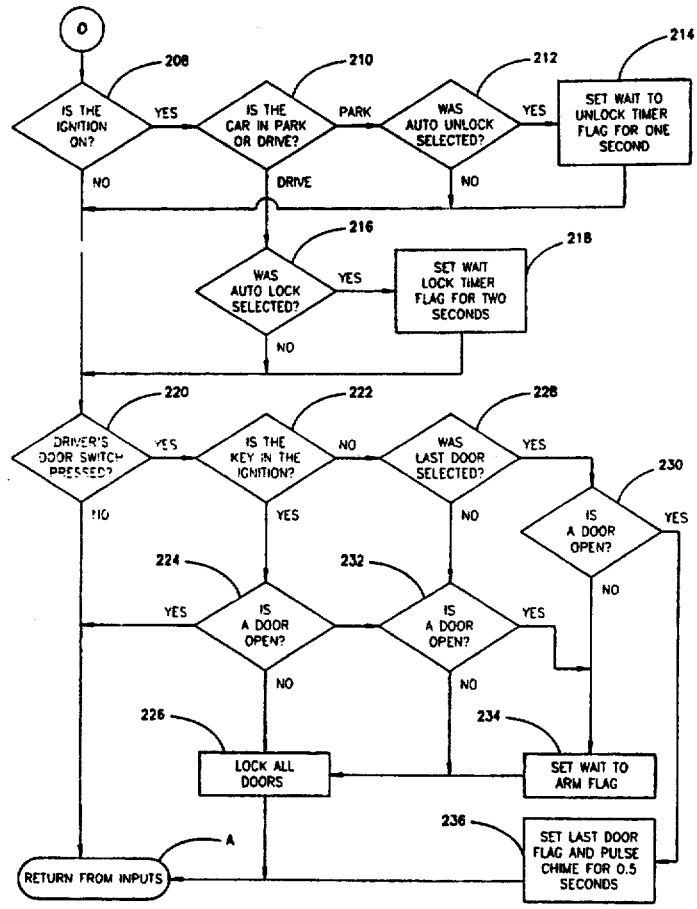

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 10, lines 39–51:

Thus, if the car is in park and the switch has been selected, an unlock timer flag is set as indicated by block 214. If the parked car is in drive, however, as indicated by a decision in block 210, block 216 tests to determine if the auto lock selector switch 32 is set and if so, sets a "wait to lock" flag as indicated by block 218 with a two second delay. *As described below with reference to FIG. 13B, the automatic locking of the doors occurs after a predetermined time delay including the two second delay of block 218.* The program then tests to determine if the driver's locking switch is actuated as indicated by block 220 and if so, is the key in the ignition as indicatd by block 222. If it is, the test determines whether the door is open as indicated by block 224 and if not, the lock all doors control command is generated as indicated by block 226.

Column 10, line 63 to column 11, line 4:

[This occurs after a predetermined time delay including the two second delay of block 218.] Last door closed signal, as can be appreciated, is the same as an all door closed signal when the courtesy lights are extinguished. If the last door closed feature was not selected, it tests again whether a door is open as indicated by block 232 and if not, all doors are locked as indicated by block 226, if yes, an alarm flag is set as indicated by arm flag 234. If the door is open as indicated by block 230, the last door flag is set as indicated by block 236 and the vehicle chime is pulsed as indicated by block 236 and the program proceeds to input port A of FIG. 5B.

AS A RESULT OF REEXAMINATION, IT HAS BEEN DETERMINED THAT:

Claims 1 and 2 are determined to be patentable as amended.

New claim 3 is added and determined to be patentable.

1. A vehicle door locking system comprising:
   a plurality of electrically acutated vehicle door locks for a vehicle;
   means for detecting the closure status of the vehicle doors, said means detecting that all the vehicle doors are closed;
   input circuit means for controlling said door locks, *said input circuit means includes at least one operator manually actuated switch for generating an input signal;* and
   a microcontroller coupled to said door locks, to said detecting means and to said input circuit means, said microcontroller responsive to *said* input [signals] *signal* from said [input circuit means] *switch* for locking all doors of the vehicle *without delay when said input signal is received when none of said vehicle doors are open,* wherein *only* when [one of] said input [signals] *signal* is received from said [input circuit means] *switch* when at least one of said vehicle doors is open, said microcontroller is responsive to [said one of] said input [signals] *signal* to lock all doors of the vehicle a predetermined time period after said detecting means detects that all doors have been closed.

2. The system as defined in claim 1 wherein said [input circuit means includes an] operator [actuator] *manually actuated* switch *is positioned on one of said vehicle doors.*

3. *The system as defined in claim 1 and further including a selectable switch having a first position and a second position, wherein said microcontroller is responsive to said input signal when at least one of said vehicle doors is open to lock all doors of the vehicle a predetermined time period after said detecting means detects that all doors have been closed only when said selectable switch is in said first position.*

* * * * *